US012707395B2

(12) United States Patent
Patra et al.

(10) Patent No.: US 12,707,395 B2
(45) Date of Patent: Aug. 11, 2026

(54) DEVICE AND METHOD FOR UPDATING POWER SCHEDULE

(71) Applicant: QUALCOMM Incorporated, San Diego, CA (US)

(72) Inventors: Gopinath Patra, Bangalore (IN); Pradeep Kumar Kotha, Bangalore (IN); Priyank Rai, Bhopal (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/620,852

(22) Filed: Mar. 28, 2024

(65) Prior Publication Data

US 2025/0310889 A1 Oct. 2, 2025

(51) Int. Cl.
*H04W 52/02* (2009.01)
*H04W 24/02* (2009.01)

(52) U.S. Cl.
CPC ....... *H04W 52/0248* (2013.01); *H04W 24/02* (2013.01)

(58) Field of Classification Search
CPC ... H04W 52/0248; H04W 24/02; Y02D 30/70
See application file for complete search history.

(56) References Cited

U.S. PATENT DOCUMENTS 10,925,001 B2 * 2/2021 Bhanage .................. G06N 3/02
11,012,936 B2 * 5/2021 Wang ................ H04W 52/0229
11,064,387 B1 * 7/2021 Movshovich ........ H04N 13/194
11,502,534 B2 * 11/2022 Baumgartner .......... H02J 7/007
2019/0349851 A1 * 11/2019 Kim ...................... H04W 80/06
2021/0405727 A1 * 12/2021 Singh ...................... G06F 1/329
2023/0309169 A1 * 9/2023 Klein .................... H04W 76/34
2024/0058694 A1 * 2/2024 Lindero ................ A63F 13/352
2024/0187877 A1 * 6/2024 Esswie ................... G06N 20/00
2024/0202538 A1 * 6/2024 Nadamuni Raghavan ................. G06N 20/00
2025/0048415 A1 * 2/2025 Mitra .................. H04W 72/542

FOREIGN PATENT DOCUMENTS

WO WO-2022256761 A1 * 12/2022 ........ H04W 52/0216

* cited by examiner

*Primary Examiner* — Omar J Ghowrwal
*Assistant Examiner* — Sanaa Al Samahi
(74) *Attorney, Agent, or Firm* — Polsinelli LLP/QUALCOMM Incorporated

(57) ABSTRACT

Disclosed are systems and techniques for wireless communications. For instance, a process can include receiving an indication of one or more parameters for input to a reinforcement learning machine learning (ML) model; determining a power schedule for a wireless communications chipset based on the one or more parameters using the reinforcement learning ML model; and determining to switch the wireless communications chipset into a low power state or a higher power state based on the determined power schedule.

19 Claims, 14 Drawing Sheets

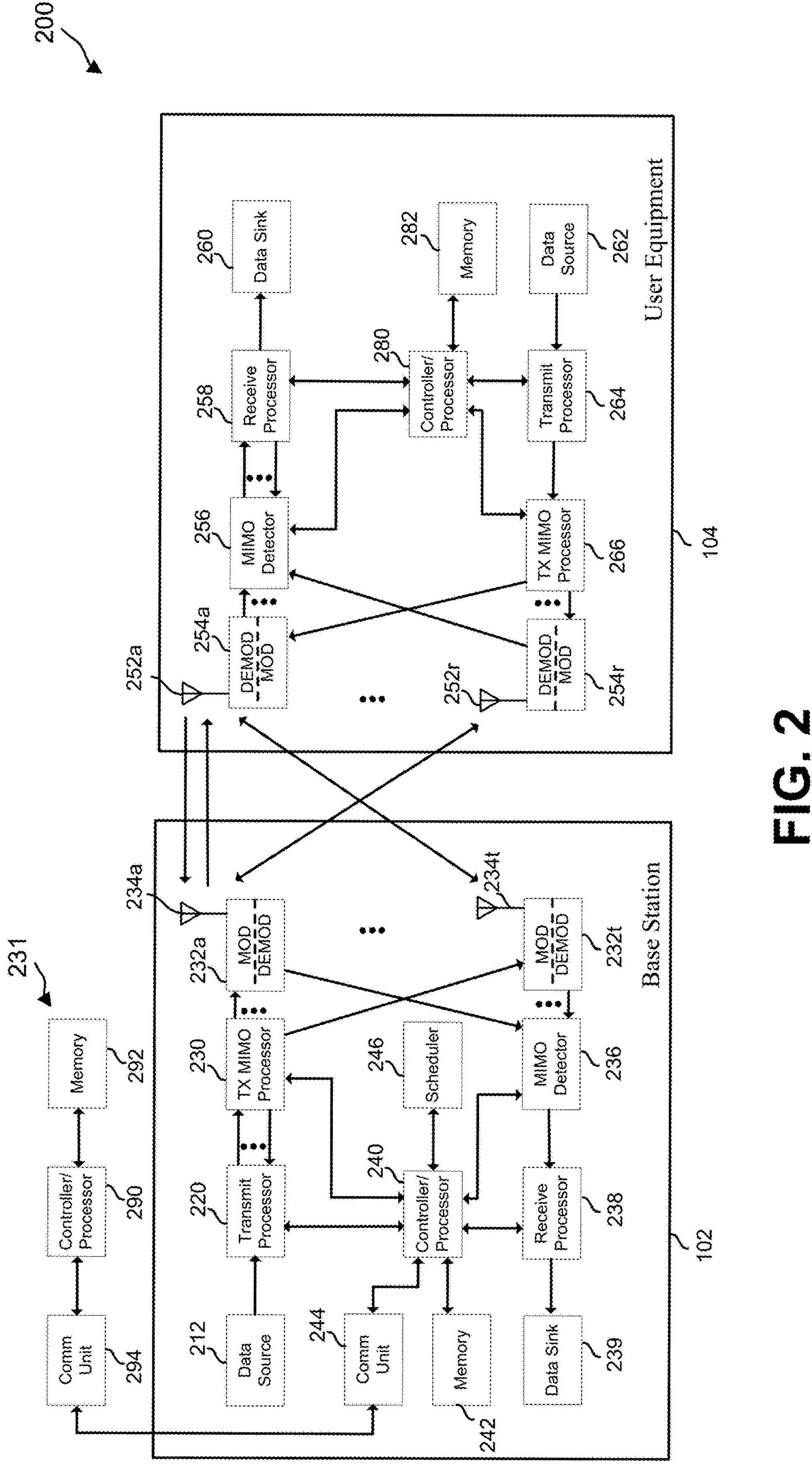
200
231
Memory
292
Controller/ Processor
290
Comm Unit
294
Base Station
102
Data Source
212
Transmit Processor
220
TX MIMO Processor
230
MOD DEMOD
232a
232t
234a
234t
Scheduler
246
Controller/ Processor
240
Comm Unit
244
Memory
242
MIMO Detector
236
Receive Processor
238
Data Sink
239
User Equipment
104
252a
252r
DEMOD MOD
254a
254r
MIMO Detector
256
Receive Processor
258
Data Sink
260
Controller/ Processor
280
Memory
282
Data Source
262
Transmit Processor
264
TX MIMO Processor
266
FIG. 2

650

TWT SP Lengths (ms) 658

TWT Offsets(ms) 660

| | 4 | 6 | 8 | 10 | 12 |
|---|---|---|---|---|---|
| 0 | P(0, 4) | | | | |
| 2 | | P(0, 6) | | | |
| 4 | | | | | |
| 6 | | | | | |
| 8 | | | P(8, 8) | | |
| 12 | | | | | |

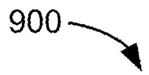

Receive An Indication Of One Or More Parameters For Input To A Reinforcement Learning Machine Learning (ML) Model
902

↓

Determine A Power Schedule For The Wireless Communications Chipset Based On The One Or More Parameters Using The Reinforcement Learning ML Model
904

↓

Determine To Switch The Wireless Communications Chipset Into A Low Power State Or A Higher Power State Based On The Determined Power Schedule
906

FIG. 9

DEVICE AND METHOD FOR UPDATING POWER SCHEDULE

FIELD

The present disclosure generally relates to wireless communications. For example, aspects of the present disclosure relate to systems and techniques for dynamic pattern for active-inactive states for wireless communications.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE)®, WiMax®. Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi®, Bluetooth®, among others. "LTE® and WiMAX® are registered trademarks of their respective standards bodies; Wi-Fi® is a registered trademark of Wi-Fi Alliance; Bluetooth® is a registered trademark of Bluetooth SIG, Inc. All trademarks are the property of their respective owners."

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

Although wireless communication systems have made great technological advancements over many years, challenges still exist. For example, certain devices, such as extended reality (XR) devices (e.g., virtual reality (VR) and/or augmented reality (AR) device), may include many different applications which are regularly performing many different uplink and/or downlink transmissions. While these transmissions together may utilize less bandwidth than available bandwidth, the timing of these transmissions may make it difficult for the wireless communications systems to enter a power saving mode (e.g., sleep mode) to reduce power consumption of the wireless communications system as compared to an active mode. Consequently, techniques to improve power savings for such devices may be enhanced.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a wireless node for wireless communications is provided. The first device includes at least one memory comprising instructions and at least one processor coupled to the at least one memory and configured to: receive an indication of one or more parameters for input to a reinforcement learning machine learning (ML) model; determine a power schedule for the wireless communications chipset based on the one or more parameters using the reinforcement learning ML model; and determine to switch the wireless communications chipset into a low power state or a higher power state based on the determined power schedule.

As another example, a method for wireless communications is provided. The method includes: receiving an indication of one or more parameters for input to a reinforcement learning machine learning (ML) model; determining a power schedule for a wireless communications chipset based on the one or more parameters using the reinforcement learning ML model; and determining to switch the wireless communications chipset into a low power state or a higher power state based on the determined power schedule.

In another example, a non-transitory computer-readable medium having stored thereon instructions that, when executed by at least one processor, cause the at least one processor to: receive an indication of one or more parameters for input to a reinforcement learning machine learning (ML) model; determine a power schedule for a wireless communications chipset based on the one or more parameters using the reinforcement learning ML model; and determine to switch the wireless communications chipset into a low power state or a higher power state based on the determined power schedule.

As another example, an apparatus for wireless communications is provided. The apparatus includes: means for receiving an indication of one or more parameters for input to a reinforcement learning machine learning (ML) model; means for determining a power schedule for a wireless communications chipset based on the one or more parameters using the reinforcement learning ML model; and means for determining to switch the wireless communications chipset into a low power state or a higher power state based on the determined power schedule.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). In some aspects, one or more of the apparatuses described herein comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus(es) includes at least one camera for capturing one or more images or video frames. For example, the apparatus(es) can include a camera (e.g., an RGB camera) or multiple cameras for capturing one or more images and/or one or more videos including video frames. In some aspects, the apparatus(es) includes at least one display for displaying one or more images, videos, notifications, or other displayable data. In some aspects, the apparatus(es) includes at least one transmitter configured to transmit one or more video frame and/or syntax data over a transmission medium to at least one device. In some aspects, the at least one processor includes a neural processing unit (NPU), a neural signal processor (NSP), a central processing unit (CPU), a graphics processing unit (GPU), any combination thereof, and/or other processing device or component. It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIG. 2 is a diagram illustrating a design of a base station and a User Equipment (UE) device that enable transmission and processing of signals exchanged between the UE and the base station, in accordance with some examples;

FIG. 6B illustrates a table of penalty scores, in accordance with aspects of the present disclosure;

FIG. 9 is a flow diagram illustrating another example of a process for wireless communications, in accordance with aspects of the present disclosure.

DETAILED DESCRIPTION

Figure 1A:
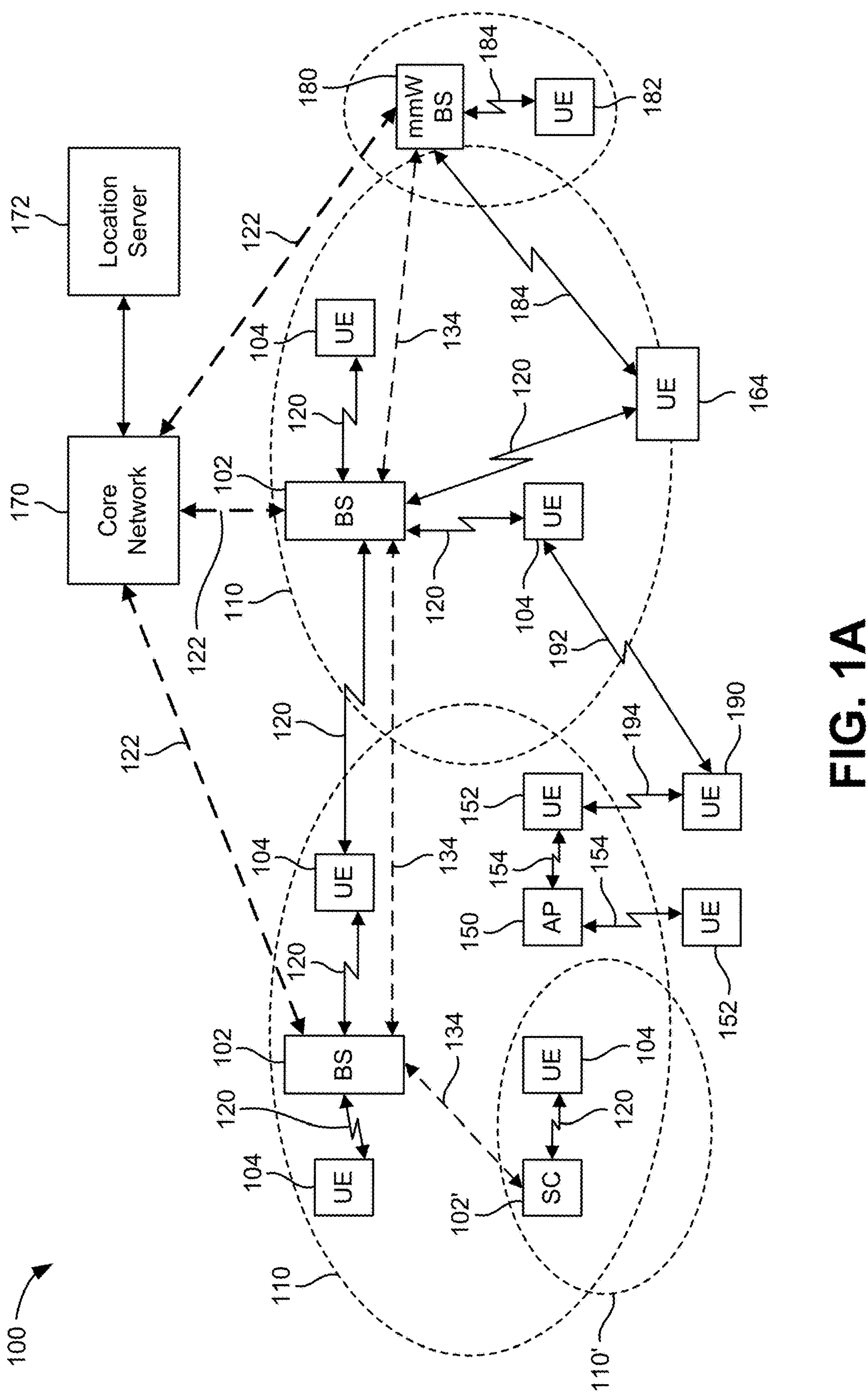
FIG. 1A is a block diagram illustrating an example of a wireless communication network, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Extended reality (XR) devices or systems can provide virtual content to a user and/or can combine real-world or physical environments and virtual environments (made up of virtual content) to provide users with XR experiences. XR devices typically use powerful processors to perform feature analysis (e.g., extraction, tracking, etc.) and other complex functions quickly enough to display an output based on those functions to their users. Powerful processors generally draw power at a high rate. Similarly, sending large quantities of data to a powerful processor typically draws power at a high rate. Headsets and other portable devices typically have small batteries so as not to be uncomfortably heavy to users. Thus, some XR devices must be plugged into an external power source, and are thus not portable. Portable XR devices generally have short battery lives and/or are uncomfortably heavy due to inclusion of large batteries.

An XR device may include a head mounted display (HMD), glasses, or other device that may be worn by a user of the XR device. Generally, it is desirable to keep an XR device display as lightweight and small as possible. To help reduce the weight and the size of an XR device display, the XR device display may be a relatively lower power system (e.g., in terms of battery and/or computational power) and the HMD display may be connected (e.g., wired or wireless connected) to another device (e.g., a mobile phone, a server device, or other device), referred to as a computing device or companion device. The computing device may be a relatively higher power system (e.g., in terms of battery and/or computational power) and may perform certain processing tasks for the XR device. For instance, the computing device can perform split rendering (or remote rendering) and can provide rendered content to the XR device. In one example, the computing device can perform processing tasks for generating information to be displayed on the XR device display. In some cases, such processing tasks may be split between the computing device and the XR device display. The XR device can transmit information to the computing device (for rendering XR content) over a communications link, and the computing device can transmit the rendered data to the XR device over the communications link (or network connection). The communications link can include a Wi-Fi communications link, a cellular communications link, or other communications link. Wi-Fi will be used herein as an example of a communications link. However, the systems and techniques described herein can be used for any type of communications link between an XR device and a computing device used for split rendering in an XR system.

In an XR application stack of an XR device, there may be a requirement of multiple uplink (from the XR device to the computing device) and downlink stream (from the computing device to the XR device) at various frame rates (e.g., measured as frames per second (FPS)). For example, pose data may be transmitted (to the computing device and/or the computing device) at a FPS of 45 Hertz (Hz), tracking camera information at 5-10 Hz, image frame information (e.g., from an RGB camera) at 30 Hz, etc. However, the quantum of data is relatively less as compared to what the communications link (e.g., a Wi-Fi link) can typically support, which can allow opportunities for save power over the communications link (e.g., the Wi-Fi link).

Systems, apparatuses, processes (also referred to as methods), and computer-readable media (collectively referred to as "systems and techniques") are described herein for dynamic patterns for active-inactive states for wireless communications. In some aspects, to save power, a communications component, radio access technology (RAT) chipset, or subsystem, such as a Wi-Fi chipset or system-on-chip (SOC) (e.g., a wireless local area network (WLAN) chipset or SOC), can be turned off when data is sparse and can be turned on when data is expected to be transmitted and/or received. For example, for a Wi-Fi based RAT, a target wake time (TWT) may be used to allow the Wi-Fi chipset to be placed in a low power state (e.g., sleep mode). In TWT, a client device may indicate to an access point (e.g., wireless node) a TWT (or vice versa) and the Wi-Fi chipset may enter the low power state until a time specified in the TWT. The access point may also refrain from transmitting data for the client device while the client device is in the low power state.

According to some aspects, the systems and techniques can determine a power schedule for a wireless communication chipset (e.g., RAT chipset, such as a Wi-Fi system of a wireless device) by processing one or more parameters (e.g., by a reinforcement learning machine learning (ML) model). In some cases, power saving engine of a RAT chipset can determine the power schedule. The one or more parameters can include a primary frequency of operations, a latency budget, a power budget, any combination thereof, and/or other parameter(s). The systems and techniques can determine to switch the wireless communications chipset into a low power state or a higher power state based on the determined power schedule. For instance, in some cases, it may be useful to align the TWT to a primary frequency of operations of applications executing on the client device. For example, in an XR device, images may be provided to an XR display at a certain frame rate (e.g., frames per second (FPS), frequency, etc.) and if information about the images to be displayed is delayed beyond a certain amount of time, the images (e.g., frames) to be displayed may not be ready in time and may be dropped. This frame rate may be used as the primary frequency of operations for XR applications. In some cases, this primary frequency of operations may be provided along with a latency budget (e.g., a maximum amount of time it takes for the motion to get reflected on the display (Max M2R2P)) and power budget to a power saving engine of a RAT chipset (e.g., Wi-Fi system of a wireless device).

As noted previously, the power saving engine may be based on a reinforcement learning ML model and the power saving engine may determine a power schedule based on the one or more parameters, such as the primary frequency of operations, the latency budget, and/or the power budget. In some cases, the power schedule may include a TWT SP start offset and an amount of time the RAT chipset may stay in an active state for a service interval (e.g., TWT service period (SP) length). The service interval may be based on the latency budget/primary frequency of operations. The RAT chipset may then be placed in the low power state or high power state based on the power schedule.

According to some aspects, the systems and techniques can use reinforcement learning (RL) to decide on an active-inactive communications pattern (e.g., a pattern for causing the communications component or subsystem to wake and sleep and for how long) for the communications component or subsystem. In some cases, inputs to a power saving engine can include a primary frequency/frame rate of operation (e.g., an FPS of a TWT service interview (SI)) and a latency budget, a minimum (min) and/or maximum TWT service period (SP) length. In some examples, search parameters for reinforcement learning can be a TWT start offset from Timing synchronization function (TSF)=0 and a TWT SP length. A goal of the power saving engine can be to minimize a power estimate. The power saving engine can minimize a motion to render to photon (M2R2P) estimate from the XR stack (e.g., to ensure that a P99 or average metric is met).

In some aspects, the systems and techniques can block of out of turn packets from reaching the communications component or subsystem (e.g., the RAT chipset or SOC) outside of the TWT SP determined using the power saving engine, which can avoid unwanted wakeups and thus reduce power. In some cases, a WLAN driver running on a host processor of the communications component or subsystem (e.g., the Wi-Fi chipset or SOC) can buffer the packets from application. In some examples, the communications component or subsystem can send indications to the WLAN driver indicating when to download frames to the communications component or subsystem (e.g., the Wi-Fi chipset or SOC). In some examples, the WLAN driver can synchronize the WLAN TSF from the communications component or subsystem (e.g., the Wi-Fi chipset or SOC) to send at periodic intervals aligned with TWT and buffer the rest of the time.

Additional aspects of the present disclosure are described in more detail below.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a gNB for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16 QAM, 32 QAM, 64 QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1A illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1A, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 1B:
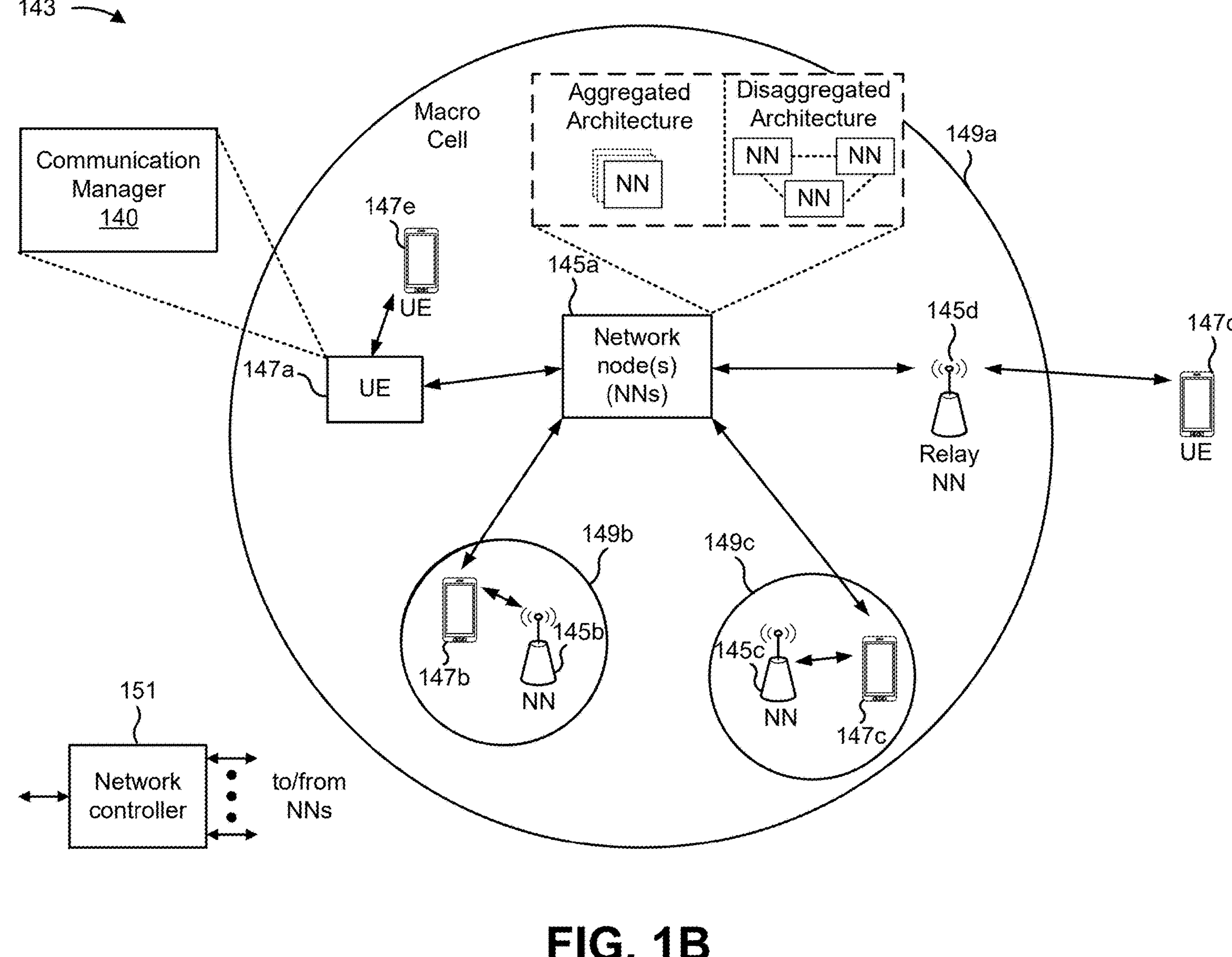
FIG. 1B is a diagram illustrating another example of a wireless network, in accordance with the present disclosure.

FIG. 1B is a diagram illustrating another example of a wireless network 143, in accordance with the present disclosure. The wireless network 143 may be or may include elements of a 5G (e.g., NR) network and/or a 4G (e.g., Long Term Evolution (LTE)) network, among other examples. The wireless network 143 may include one or more network nodes 145 (shown as a network node 145*a*, a network node 145*b*, a network node 145*c*, and a network node 145*d*), a user equipment (UE) 147 or multiple UEs 147 (shown as a UE 147*a*, a UE 147*b*, a UE 147*c*, a UE 147*d*, and a UE 147*e*), and/or other entities. A network node 145 is a network node that communicates with UEs 147. As shown, a network node 145 may include one or more network nodes. For example, a network node 145 may be an aggregated network node, meaning that the aggregated network node is configured to utilize a radio protocol stack that is physically or logically integrated within a single radio access network (RAN) node (e.g., within a single device or unit). As another example, a network node 145 may be a disaggregated network node (sometimes referred to as a disaggregated base station), meaning that the network node 145 is configured to utilize a protocol stack that is physically or logically distributed among two or more nodes (such as one or more central units (CUs), one or more distributed units (DUs), or one or more radio units (RUs)).

In some examples, a network node 145 is or includes a network node that communicates with UEs 147 via a radio access link, such as an RU. In some examples, a network node 145 is or includes a network node that communicates with other network nodes 145 via a fronthaul link or a midhaul link, such as a DU. In some examples, a network node 145 is or includes a network node that communicates with other network nodes 145 via a midhaul link or a core network via a backhaul link, such as a CU. In some examples, a network node 145 (such as an aggregated network node 145 or a disaggregated network node 145) may include multiple network nodes, such as one or more RUs, one or more CUs, and/or one or more DUs. A network node 145 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 145 may be interconnected to one another or to one or more other network nodes 145 in the wireless network 143 through various types of fronthaul, midhaul, and/or backhaul interfaces, such as a direct physical connection, an air interface, or a virtual network, using any suitable transport network.

In some examples, a network node 145 may provide communication coverage for a particular geographic area. In the Third Generation Partnership Project (3GPP), the term "cell" can refer to a coverage area of a network node 145 and/or a network node subsystem serving this coverage area, depending on the context in which the term is used. A network node 145 may provide communication coverage for a macro cell, a pico cell, a femto cell, and/or another type of cell. A macro cell may cover a relatively large geographic area (e.g., several kilometers in radius) and may allow unrestricted access by UEs 147 with service subscriptions. A pico cell may cover a relatively small geographic area and may allow unrestricted access by UEs 147 with service subscriptions. A femto cell may cover a relatively small geographic area (e.g., a home) and May allow restricted access by UEs 147 having association with the femto cell (e.g., UEs 147 in a closed subscriber group (CSG)). A network node 145 for a macro cell may be referred to as a macro network node. A network node 145 for a pico cell may be referred to as a pico network node. A network node 145 for a femto cell may be referred to as a femto network node or an in-home network node. In the example shown in FIG. 1B, the network node 145*a* may be a macro network node for a macro cell 149*a*, the network node 145*b* may be a pico network node for a pico cell 149*b*, and the network node 145*c* may be a femto network node for a femto cell 149*c*. A network node may support one or multiple (e.g., three) cells. In some examples, a cell may not necessarily be stationary, and the geographic area of the cell may move according to the location of a network node 145 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 145. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 143 may include one or more relay stations. A relay station is a network node that can receive a transmission of data from an upstream node (e.g., a network node 145 or a UE 147) and send a transmission of the data to a downstream node (e.g., a UE 147 or a network node 145). A relay station may be a UE 147 that can relay transmissions for other UEs 147. In the example shown in FIG. 1B, the network node 145*d* (e.g., a relay network node) may communicate with the network node 145*a* (e.g., a macro network node) and the UE 147*d* in order to facilitate communication between the network node 145*a* and the UE 147*d*. A network node 145 that relays communications may be referred to as a relay station, a relay base station, a relay network node, a relay node, a relay, or the like.

The wireless network 143 may be a heterogeneous network that includes network nodes 145 of different types, such as macro network nodes, pico network nodes, femto network nodes, relay network nodes, or the like. These different types of network nodes 145 may have different transmit power levels, different coverage areas, and/or different impacts on interference in the wireless network 143. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 151 may couple to or communicate with a set of network nodes 145 and may provide coordination and control for these network nodes 145. The network controller 151 may communicate with the network nodes 145 via a backhaul communication link or a midhaul communication link. The network nodes 145 may communicate with one another directly or indirectly via a wireless or wireline backhaul communication link. In some aspects, the network controller 151 may be a CU or a core network device, or may include a CU or a core network device.

The UEs 147 may be dispersed throughout the wireless network 143, and each UE 147 may be stationary or mobile. A UE 147 may include, for example, an access terminal, a terminal, a mobile station, and/or a subscriber unit. A UE 147 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 147 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 147 may be considered Internet-of-Things (IoT) devices, and/or may be implemented as NB-IoT (narrowband IoT) devices. Some UEs 147 may be considered a Customer Premises Equipment. A UE 147 may be included inside a housing that houses components of the UE 147, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 143 may be deployed in a given geographic area. Each wireless network 143 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 147 (e.g., shown as UE 147*a* and UE 147*e*) may communicate directly using one or more sidelink channels (e.g., without using a network node 145 as an intermediary to communicate with one another). For example, the UEs 147 may communicate using peer-to-peer communications, (P2P) device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 147 may perform scheduling operations, resource selection operations, and/or other operations described elsewhere herein as being performed by the network node 145.

Devices of the wireless network 143 may communicate using the electromagnetic spectrum, which may be subdivided by frequency or wavelength into various classes, bands, channels, or the like. For example, devices of the wireless network 143 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 147) may include a communication manager 140. As described in more detail elsewhere herein, the communication manager 140 may buffer, at a selected layer of the UE, a set of XR data associated with a plurality of XR applications instantiated on the UE based on at least one of latency information or power information in association with a buffering time period; and transmit the set of XR data based on at least one of an expiration of the buffering time period or an indication associated with an XR application of the plurality of XR applications. Additionally, or alternatively, the communication manager 140 may perform one or more other operations described herein.

Figure 1C:
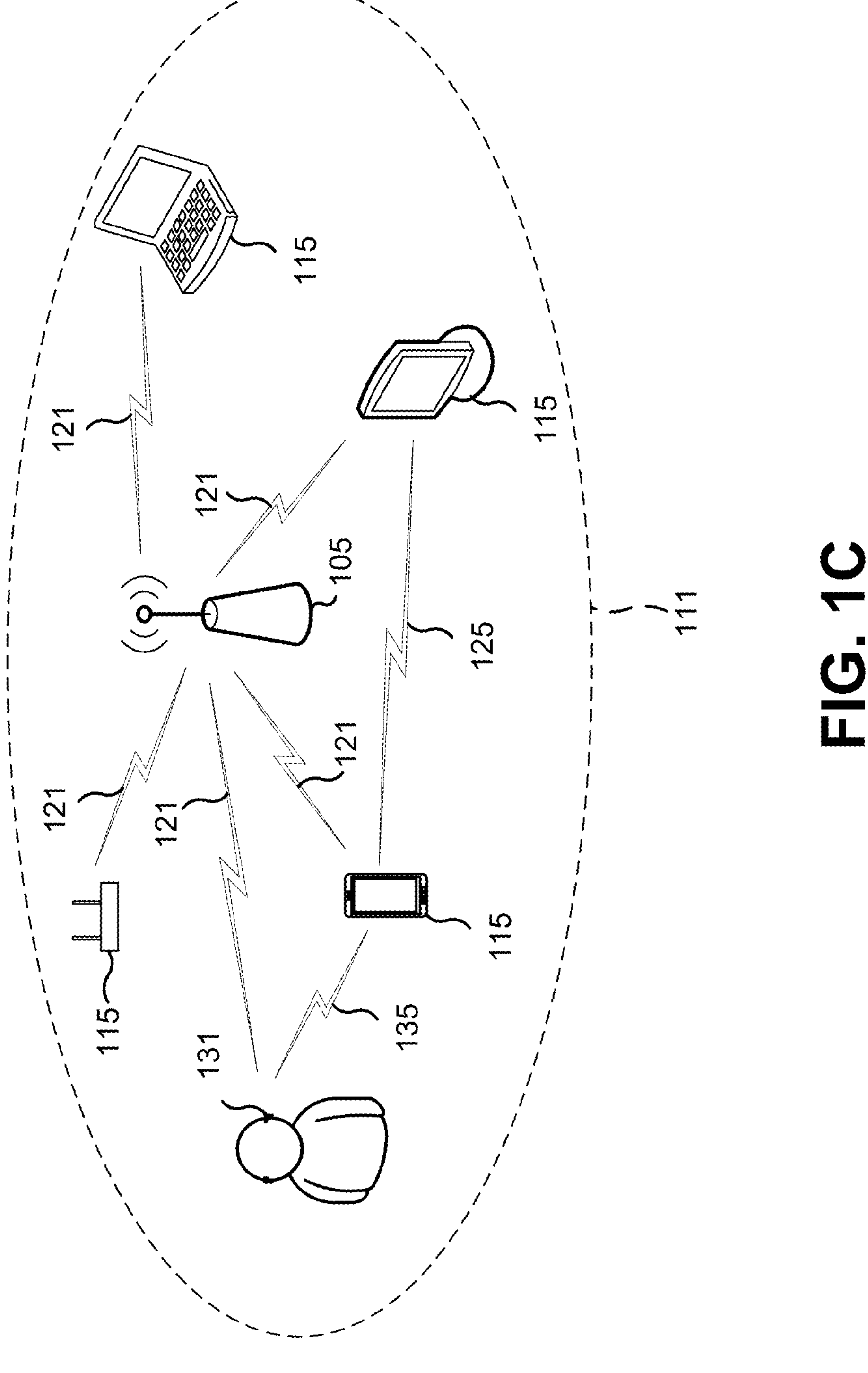
FIG. 1C illustrates a wireless communication system (also known as a wireless local area network (WLAN) or a Wi-Fi network) configured in accordance with the present disclosure.

FIG. 1C illustrates a wireless communication system 107 (also known as a wireless local area network (WLAN) or a Wi-Fi network) configured in accordance with the present disclosure. The wireless communication system 107 may include an access point (AP) 105 and multiple associated device 115 (such as stations (STAs) or SAPs), which may represent devices such as mobile stations, personal digital assistants (PDAs), other handheld devices, netbooks, notebook computers, tablet computers, laptops, display devices (e.g., TVs, computer monitors, etc.) printers, SR systems (such as XR system 500 of FIG. 5), etc. In some cases, the associated devices 115 may include UEs, such as UE 104, 190, 164, 182 of FIG. 1A, UE 147 of FIG. 1B, wireless device 407 of FIG. 4, wireless device 800 of FIG. 8A, etc. The AP 105 and the associated device 115 (e.g., associated STAs) may represent a basic service set (BSS) or an extended service set (ESS). A BSS includes devices that communicate with the AP 105 via communications links

121, and an ESS may include multiple BSSs or one or more BSSs and associated wired networks. The various devices 115 in the network may be able to communicate with one another through the AP 105. Also shown is a coverage area 111 of the AP 105, which may represent a basic service area (BSA) of the wireless communication system 107. An extended network station (not shown) associated with the wireless communication system 107 may be connected to a wired or wireless distribution system that may allow multiple APs 105 to be connected in an ESS.

Although not shown in FIG. 1C, a device 105 may be located in the intersection of more than one coverage area 111 and may associate with more than one AP 105. A single AP 105 and an associated set of device 115 may be referred to as a BSS. An ESS is a set of connected BSSs. A distribution system (not shown) may be used to connect APs 105 in an ESS. In some cases, the coverage area 111 of an AP 105 may be divided into sectors (also not shown). The wireless communication system 107 may include APs 105 of different types (e.g., metropolitan area, home network, etc.), with varying and overlapping coverage areas 111. Two devices 115 may also communicate directly via a direct wireless communication link 125 regardless of whether both device 115 are in the same coverage area 111. Examples of direct wireless communication links 125 may include Wi-Fi Direct connections, Wi-Fi Tunneled Direct Link Setup (TDLS) links, and other group connections.

In some cases, a device 105 (or an AP 105) may be detectable by a central AP 105, but not by other device 115 in the coverage area 111 of the central AP 105. For example, one device 105 may be at one end of the coverage area 111 of the central AP 105 while another device 105 may be at the other end. Thus, both device 115 may communicate with the AP 105, but may not receive the transmissions of the other. This may result in colliding transmissions for the two device 115 in a contention-based environment (e.g., carrier sense multiple access with collision avoidance (CSMA/CA)) because the device 115 may not refrain from transmitting on top of each other. A device 105 whose transmissions are not identifiable, but that is within the same coverage area 111 may be known as a hidden node. CSMA/CA may be supplemented by the exchange of a request-to-send (RTS) packet transmitted by a sending device 105 (or AP 105) and a clear-to-send (CTS) packet transmitted by the receiving device 105 (or AP 105). This may alert other devices within range of the sender and receiver not to transmit for the duration of the primary transmission. Thus, RTS and/or CTS may help mitigate a hidden node problem.

The wireless communication system 107 may include an AP 105, device 115 (e.g., which may be referred to as source devices or central devices), and paired devices 1130 (e.g., which may be referred to as sink devices or peripheral devices) implementing WLAN communications (e.g., Wi-Fi communications) and/or Bluetooth communications. For example, device 115 may include cell phones, user equipment (UEs), STAs, mobile stations, PDAs, other handheld devices, netbooks, notebook computers, tablet computers, laptops, or some other suitable terminology. Paired devices 131 may include Bluetooth-enabled devices capable of pairing with other Bluetooth-enabled devices (e.g., such as device 115), which may include wireless audio devices (e.g., headsets, earbuds, speakers, earpieces, headphones), display devices (e.g., TVs, computer monitors), microphones, meters, valves, etc. As one example, the paired devices 1130 may include a wireless headset, which may communicate via a Bluetooth connection 135 with a device 105 that the wireless headset is paired with. In some cases, the paired device 115 may alternatively or additionally communicate with the AP 105. In some aspects, a paired device 131 may communicate with a device 105 using the AP 105.

As indicated above, FIG. 1A-1C are provided as examples. Other examples may differ from what is described with regard to FIGS. 1A-1C.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 (e.g., network nodes 145 of FIG. 1B, AP of FIG. 1C) and one of the UEs 104 in FIG. 1A (e.g., UE 147 of FIG. 1B, device 115 of FIG. 1C). Base station 102 may be equipped with T antennas 234*a* through 234*t*, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators may be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals may be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators may be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. The controller/processor 280 may also interface with a software driver, for example, to pass and/or receive information from software, such as for interfacing with an operating system, applications, etc. of the UE 104.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292. In some aspects, one or more components of UE 104 may be included in a housing.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
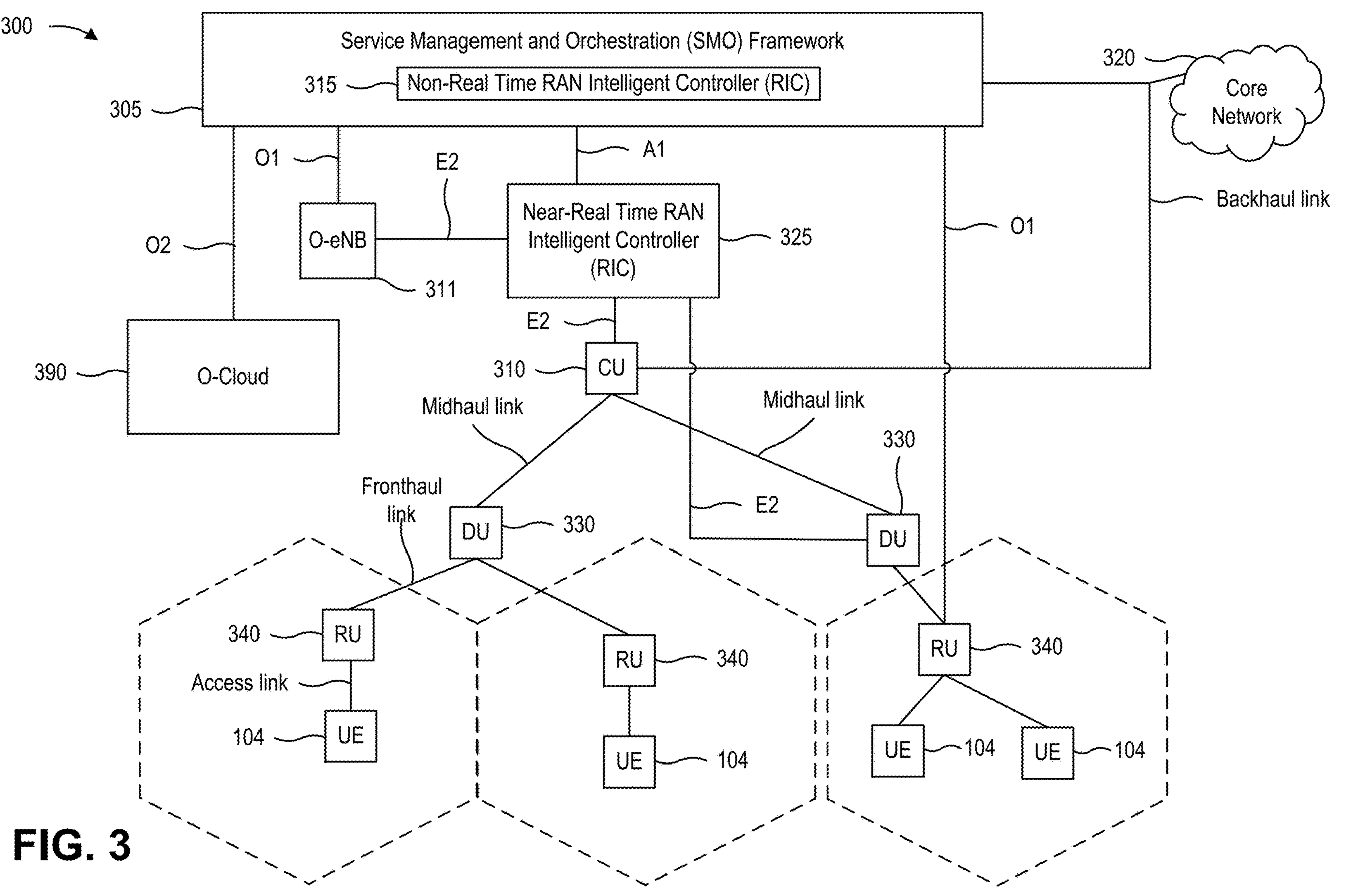
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUs 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
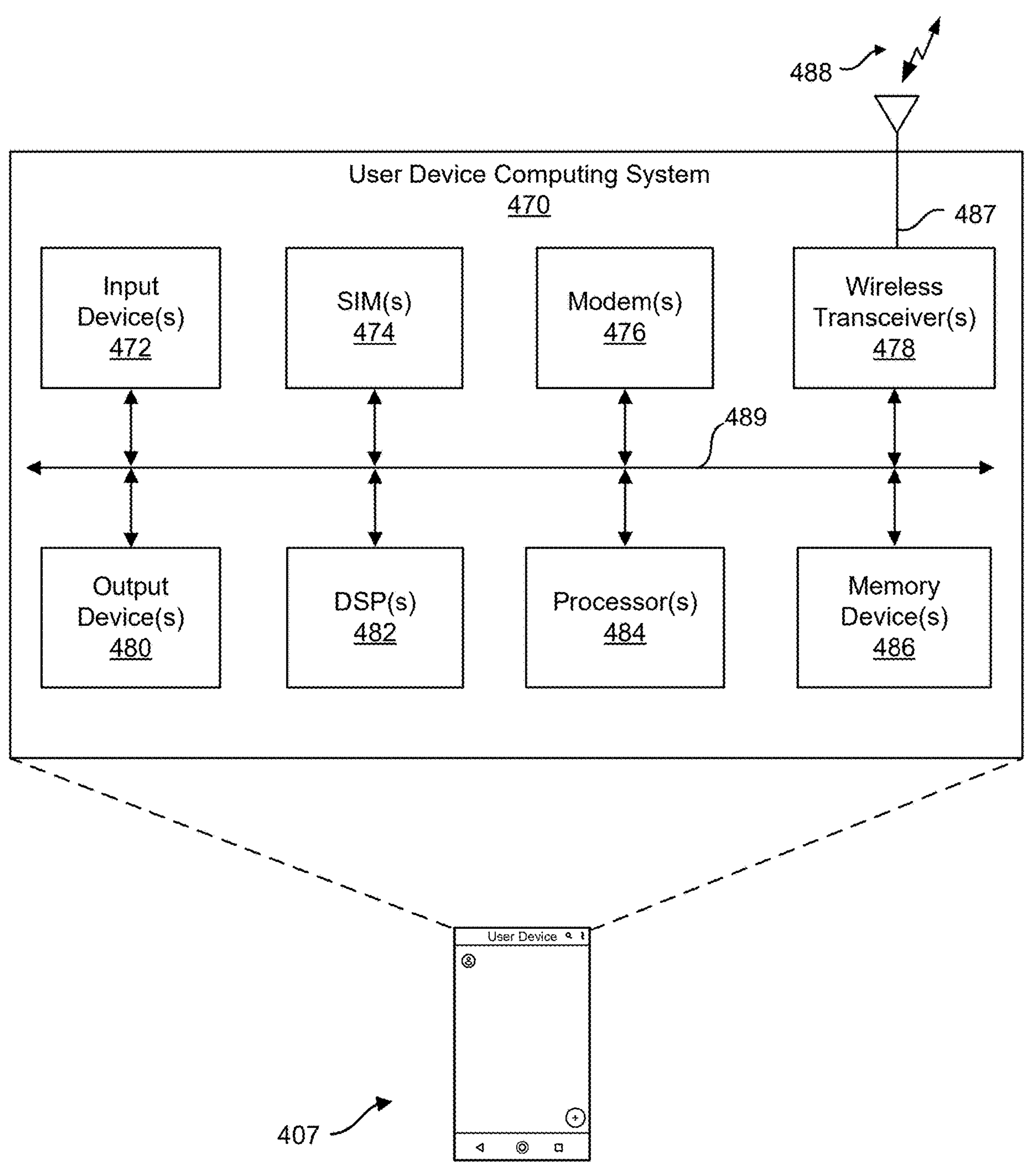
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, STA 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some cases, computing system 470 may be an extended reality (XR) device. XR systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Figure 5:
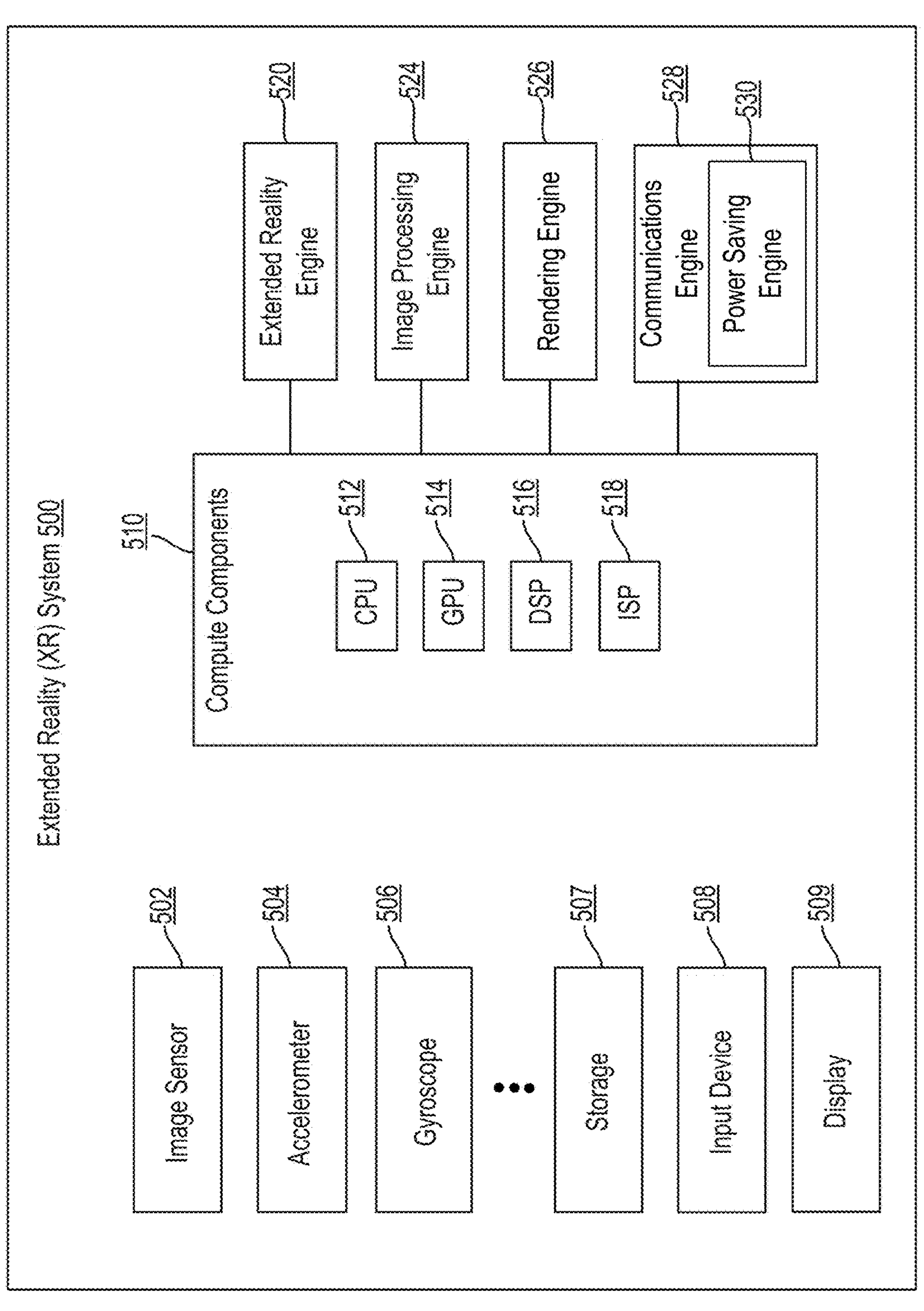
FIG. 5 is a diagram illustrating an architecture of an example extended reality (XR) system, in accordance with some aspects of the disclosure.

FIG. 5 is a diagram illustrating an architecture of an example extended reality (XR) system 500, in accordance with some aspects of the disclosure. The XR system 500 can run (or execute) XR applications and implement XR operations. In some examples, the XR system 500 can perform tracking and localization, mapping of an environment in the physical world (e.g., a scene), and/or positioning and rendering of virtual content on a display 509 (e.g., a screen, visible plane/region, and/or other display) as part of an XR experience. For example, the XR system 500 can generate a map (e.g., a three-dimensional (3D) map) of an environment in the physical world, track a pose (e.g., location and position) of the XR system 500 relative to the environment (e.g., relative to the 3D map of the environment), position and/or anchor virtual content in a specific location(s) on the map of the environment, and render the virtual content on the display 509 such that the virtual content appears to be at a location in the environment corresponding to the specific location on the map of the scene where the virtual content is positioned and/or anchored. The display 509 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 500 includes one or more image sensors 502, an accelerometer 504, a gyroscope 506, storage 507, compute components 510, an XR engine 520, an image processing engine 524, a rendering engine 526, and a communications engine 528. It should be noted that the components 502-528 shown in FIG. 5 are non-limiting examples provided for illustrative and explanation purposes, and other examples can include more, fewer, or different components than those shown in FIG. 5. For example, in some cases, the XR system 500 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 5. While various components of the XR system 500, such as the image sensor 502, may be referenced in the singular form herein, it should be understood that the XR system 500 may include multiple of any component discussed herein (e.g., multiple image sensors 502).

The XR system 500 includes or is in communication with (wired or wirelessly) an input device 508. The input device 508 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1045 discussed herein, or any combination thereof. In some cases, the image sensor 502 can capture images that can be processed for interpreting gesture commands.

The XR system 500 can also communicate with one or more other electronic devices (wired or wirelessly). For example, communications engine 528 can be configured to manage connections and communicate with one or more electronic devices. The communications engine 528 may include one or more components described in conjunction with UE 104 of FIG. 1A, UE 147 of FIG. 1B, device 115 of FIG. 1C, UE 104 of FIG. 2, wireless device 407 of FIG. 4, wireless device 800 of FIG. 8A, etc. In some cases, the communications engine 528 can correspond to the communications interface 1040 of FIG. 10.

In some implementations, the one or more image sensors 502, the accelerometer 504, the gyroscope 506, storage 507, compute components 510, XR engine 520, image processing engine 524, and rendering engine 526 can be part of the same computing device. For example, in some cases, the one or more image sensors 502, the accelerometer 504, the gyroscope 506, storage 507, compute components 510, XR engine 520, image processing engine 524, and rendering engine 526 can be integrated into an HMD, extended reality glasses, smartphone, laptop, tablet computer, gaming system, and/or any other computing device. However, in some implementations, the one or more image sensors 502, the accelerometer 504, the gyroscope 506, storage 507, compute components 510, XR engine 520, image processing engine 524, and rendering engine 526 can be part of two or more separate computing devices. For example, in some cases, some of the components 502-526 can be part of, or implemented by, one computing device and the remaining components can be part of, or implemented by, one or more other computing devices.

The storage 507 can be any storage device(s) for storing data. Moreover, the storage 507 can store data from any of the components of the XR system 500. For example, the storage 507 can store data from the image sensor 502 (e.g., image or video data), data from the accelerometer 504 (e.g., measurements), data from the gyroscope 506 (e.g., measurements), data from the compute components 510 (e.g., processing parameters, preferences, virtual content, rendering content, scene maps, tracking and localization data, object detection data, privacy data, XR application data, face recognition data, occlusion data, etc.), data from the XR engine 520, data from the image processing engine 524, and/or data from the rendering engine 526 (e.g., output frames). In some examples, the storage 507 can include a buffer for storing frames for processing by the compute components 510.

The one or more compute components 510 can include a central processing unit (CPU) 512, a graphics processing unit (GPU) 514, a digital signal processor (DSP) 516, an image signal processor (ISP) 518, and/or other processor (e.g., a neural processing unit (NPU) implementing one or more trained neural networks). The compute components 510 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 510 can implement (e.g., control, operate, etc.)

the XR engine 520, the image processing engine 524, and the rendering engine 526. In other examples, the compute components 510 can also implement one or more other processing engines.

The image sensor 502 can include any image and/or video sensors or capturing devices. In some examples, the image sensor 502 can be part of a multiple-camera assembly, such as a dual-camera assembly. The image sensor 502 can capture image and/or video content (e.g., raw image and/or video data), which can then be processed by the compute components 510, the XR engine 520, the image processing engine 524, and/or the rendering engine 526 as described herein.

In some examples, the image sensor 502 can capture image data and can generate images (also referred to as frames) based on the image data and/or can provide the image data or frames to the XR engine 520, the image processing engine 524, and/or the rendering engine 526 for processing. An image or frame can include a video frame of a video sequence or a still image.

The XR system 500 can also include other sensors in its one or more sensors. The one or more sensors can include one or more accelerometers (e.g., accelerometer 504), one or more gyroscopes (e.g., gyroscope 506), and/or other sensors. The one or more sensors can provide velocity, orientation, and/or other position-related information to the compute components 510. For example, the accelerometer 504 can detect acceleration by the XR system 500 and can generate acceleration measurements based on the detected acceleration. In some cases, the accelerometer 504 can provide one or more translational vectors (e.g., up/down, left/right, forward/back) that can be used for determining a position or pose of the XR system 500. The gyroscope 506 can detect and measure the orientation and angular velocity of the XR system 500. For example, the gyroscope 506 can be used to measure the pitch, roll, and yaw of the XR system 500. In some cases, the gyroscope 506 can provide one or more rotational vectors (e.g., pitch, yaw, roll). In some examples, the image sensor 502 and/or the XR engine 520 can use measurements obtained by the accelerometer 504 (e.g., one or more translational vectors) and/or the gyroscope 506 (e.g., one or more rotational vectors) to calculate the pose of the XR system 500. As previously noted, in other examples, the XR system 500 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 500, using a combination of one or more accelerometers, one or more gyroscopes, and/or one or more magnetometers. In some examples, the one or more sensors can output measured information associated with the capture of an image captured by the image sensor 502 (and/or other camera of the XR system 500) and/or depth information obtained using one or more depth sensors of the XR system 500.

The output of one or more sensors (e.g., the accelerometer 504, the gyroscope 506, one or more IMUs, and/or other sensors) can be used by the XR engine 520 to determine a pose of the XR system 500 (also referred to as the head pose) and/or the pose of the image sensor 502 (or other camera of the XR system 500). In some cases, the pose of the XR system 500 and the pose of the image sensor 502 (or other camera) can be the same. The pose of image sensor 502 refers to the position and orientation of the image sensor 502 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 502 to track a pose (e.g., a 6DoF pose) of the XR system 500. For example, the device tracker can fuse visual data (e.g., using a visual tracking solution) from the image data with inertial data from the measurements to determine a position and motion of the XR system 500 relative to the physical world (e.g., the scene) and a map of the physical world.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 510 can extract feature points corresponding to a mobile device (e.g., UE 104 of FIG. 1A, UE 147 of FIG. 1B, device 115 of FIG. 1C, UE 104 of FIG. 2, wireless device 407 of FIG. 4, wireless device 800 of FIG. 8A, etc.), or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 500 can also track the hand and/or fingers of the user to allow the user to interact with and/or control virtual content in a virtual environment. For example, the XR system 500 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

In some cases, an XR system may include an HMD display, such as AR HMD or AR glasses, that may be worn by a user of the XR system. Generally, it is desirable to keep an HMD display as light and small as possible. To help reduce the weight and the size of an HMD display, the HMD display may be a relatively lower power system (e.g., in terms of battery and computational power) as compared to a device (e.g., a companion device, such as a mobile phone, a server device, or other device) with which the HMD display is connected (e.g., wired or wireless connected).

In some cases, split rendering may be implemented. In split rendering, the companion device may perform certain tasks with respect to one or more images to be displayed by the HMD display and transmit results of the tasks to the HMD display. The HMD display may then perform additional image processing tasks and display the one or more images. In some cases, to perform the tasks, the HMD display may regularly transmit and/or receive multiple set of information. Examples of this information may include video data (e.g., images to be displayed), pose data, various statistics, commands, multiple camera streams, audio data, etc. In some cases, each set of information may be transmitted/received at a different rate. For example, video data may be provided at a certain data rate to the HMD display so that the video may be displayed at a particular frame rate, such as 45 frames per second (FPS). Pose data may be transmitted (to the computing device and/or the computing device) at a rate of 45 Hertz (Hz), tracking camera information at 5-10 Hz, image frame information (e.g., from an RGB camera) at 30 Hz, etc. In some cases, the combined amount information for transmission/reception may be less than the capabilities of a particular RAT (e.g., Wi-Fi, 6G, 5G, LTE, etc.) of the communications engine 528 and there may be opportunities for power savings by placing the communications engine 528 into a low power state, such as by using target wake time (TWT) for Wi-Fi RAT, or any other low power state supported by the communications engine 528. In some cases, as the multiple sets of information may each be transmitted/received at a different rate, determining when the communications engine 528 may enter (e.g., placed in) and/or exit the low power state may be difficult.

In some cases, it may be useful to determine when the communications engine 528 may enter (e.g., may be placed in) the low power state based on a primary frequency of operations and latency budget. The primary frequency of operations may be an operation that occurs at a certain frequency and if the operation does not occur at that frequency, then there may be perceptible delay or performance degradation. For example, images may be provided to an XR display at a certain frame rate (e.g., frames per second (FPS), frequency, etc.). If information about the images to be displayed is delayed beyond a certain amount of time, the images (e.g., frames) to be displayed may not be ready in time and may be dropped, resulting in a perceptible (e.g., noticeable) image quality degradation. The amount of time available to avoid performance degradation may be the latency budget. For example, the latency budget may be an amount of time in which a frame should be provided (e.g., amount of time in which successive images are received/provided) to avoid dropped frames. Of note, the frame rate that may inform the primary frequency of operations may a frame rate at which information may be provided to the XR display and this frame rate may be different from a frame rate of the display of the XR display itself (e.g., due to frame rate upsampling/downsampling, frame interpolation, etc.). In some cases, an application, such as an XR engine (e.g., XR engine 520 of FIG. 5), rendering engine (rendering engine 526 of FIG. 5), etc. may determine the primary frequency of operations as well as the latency budget.

In some cases, such as where the XR device is power constrained, the application (e.g., XR application) may also provide an indication of a power budget available to the communications engine 528. The indicated power budget may indicate an amount of power available to the communications engine 528 and the indicated power budget may indicate an amount of time (e.g., proportion) the communications engine 528 may spend in the low power state and in the higher power (e.g., active) state.

Based on the primary frequency of operations, latency budget, and indicated power budget, a power saving engine 530 of the communications engine 528 may determine a power schedule for a RAT chipset. The RAT chipset may be hardware (e.g., circuits, chips, etc.) for accessing a particular RAT network. In some cases, a ML model, such as a reinforcement learning ML model, may be used to determine the power schedule. Reinforcement learning is an ML technique that trains an ML model (e.g., a reinforcement learning ML model) to make predictions for achieving optimal results through a trial-and-error learning process. An example of a reinforcement ML model is an ML model trained using a multi-armed bandit algorithm. The power schedule may indicate an amount of time a RAT chipset of the communications engine 528 may be in a higher power state and/or lower power state (e.g., a wake/sleep cycles, schedule, or pattern). As an example, the power saving engine 530 may determine a TWT SP start offset and a TWT service period (SP) length based on the primary frequency of operations, latency budget, and indicated power budget. In some cases, the power saving engine 530 may be implemented using reinforcement learning ML model.

Figure 6A:
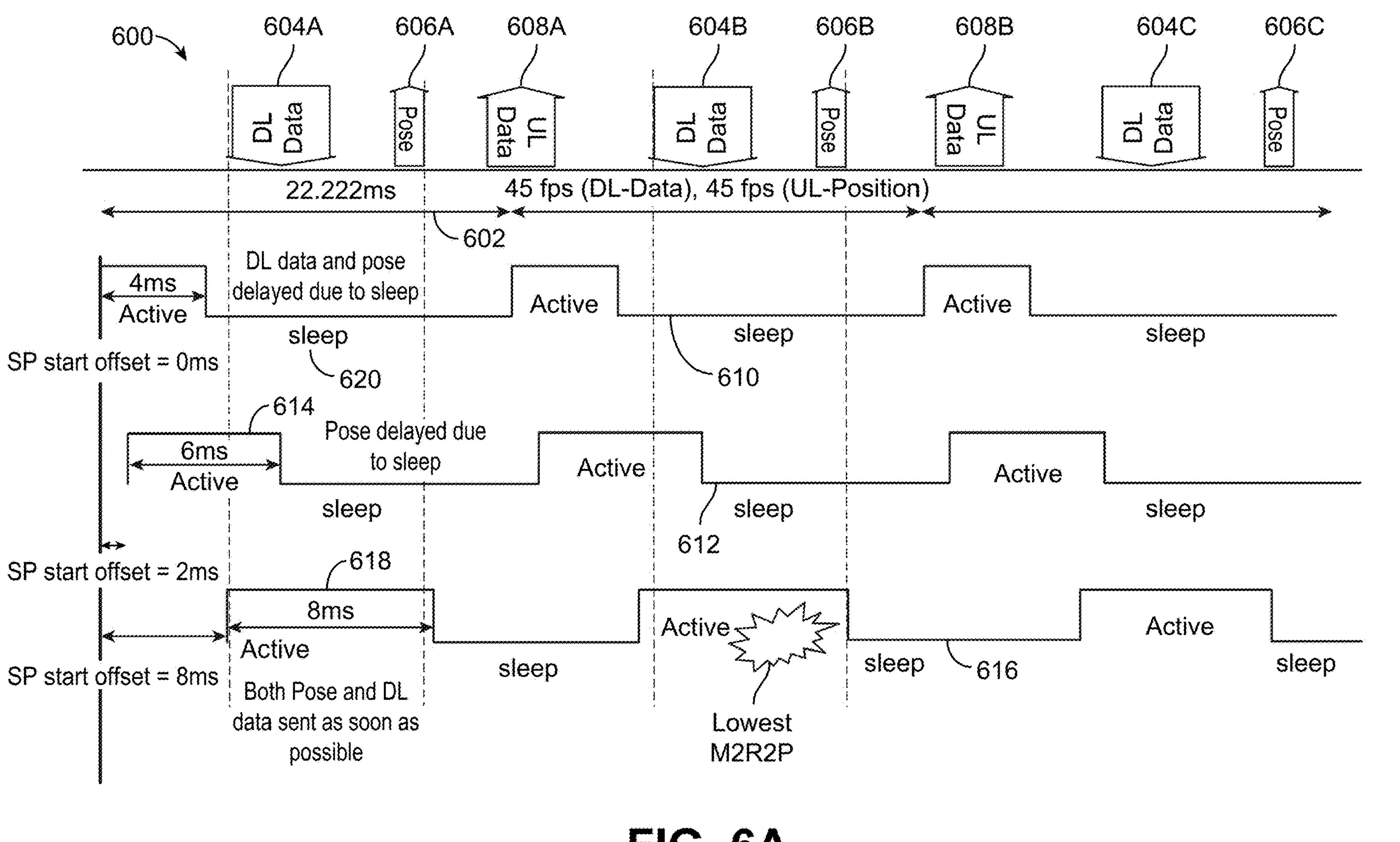
FIG. 6A is a timeline illustrating power schedules, in accordance with aspects of the present disclosure.

FIG. 6A is a timeline illustrating power schedules 600, in accordance with aspects of the present disclosure. As indicated above, a primary frequency of operations may be received, such as from an XR application, and a service interval (SI) 602 of a RAT chipset handing wireless transmission/reception of data for the XR application may be defined based on the primary frequency of operations. For example, an XR application may be configured to provide images for display at, for example, 45 FPS or approximately one image every 22.222 ms, and operations performed by the XR application may be configured to avoid delays in providing the image at this primary frequency of operations. As such, the SI 602 may be defined based on the primary frequency of operations, or 22.222 ms in this example. In some cases, the SI 602 of the RAT chipset may include an active period and an inactive (e.g., sleep) period. In some cases, one or more portions of the RAT chipset may be powered down during the inactive period.

In some cases, certain information may be more sensitive to latency, such as that induced by delayed transmission/reception than other information. Generally, relatively more latency sensitive information for an application of a device, such as an XR device, may be the information that, when delayed, causes perceptible performance degradation. For example, images may be displayed by an XR display at a certain frame rate (e.g., FPS), and if information to be displayed is delayed, frames (e.g., images) may be dropped, resulting in a perceptible (e.g., noticeable) image quality degradation. Similarly, delays in transmitting pose information may cause an image being displayed by the XR display to lag behind a movement of the XR device, which can result in a perceptible lag along with possibly nausea, headache, etc. for a user. Comparatively, statistics data may be less latency sensitive as small delays in obtaining statistics data may not cause a perceptible delay or performance degradation for the XR device. In this example, DL data (e.g., video data) 604A-604C (collectively DL data 604) and pose data 606A-606C (collectively pose data 606) may be relatively more latency sensitive information, while UL data 608A-608B (collectively UL data 608) may be less latency sensitive.

In some cases, the RAT chipset may not know what information may be relatively more latency sensitive and what information may be less latency sensitive. In some cases, a metric for measuring a perceptible delay or performance degradation may be used to help identify a TWT SP start offset and a TWT SP length (e.g., length of time (e.g., time period) of the active state (e.g., high/higher power state)) for transmitting the relatively more latency sensitive information. An example of such a metric may be a motion to render to photon (M2R2P) statistic. The M2R2P statistic measures a time between when a motion (e.g., an input), such as by a user moving the XR device, is performed, and when that motion is reflected in images being displayed by the XR device (e.g., output for display). For example, the M2R2P may indicate an amount of time between when a user of the XR display moves their real hand to when an image reflecting the movement of the hand is displayed by the XR display. In some cases, the M2R2P may be measured by an XR application (e.g., via a profile point in the XR application for sensor input and decoder output, assuming the XR sensor and display takes a fixed amount before and after software processing).

In some cases, a power saving engine of the RAT chipset may attempt to learn the TWT SP start offset and TWT SP length as a part of a learning phase of reinforcement learning. During the learning phase, different combinations of TWT SP start offsets and TWT SP lengths may be applied and the resulting metric (e.g., M2R2P) used as a penalty/loss value for reinforcement learning. The TWT SP start offset may indicate an amount of time a next TWT start (e.g., beginning of an active period (e.g., service period)) is delayed, assuming the first TWT schedule was started at time 0 (e.g., a beginning of an SI 602). In some cases, a beginning of the active period (e.g., TWT SP start offset) may be determined as a TWT is determined and thus a first active period may occur after the TWT SP start offset. In some cases, the beginning of an active cycle (e.g., first active cycle 614, second active cycle 618, etc.) may be based on a timing synchronization function (TSF). The TWT SP length may be a length of time for the active state of the TWT. In some cases, a maximum TWT SP length may be determined based on an amount of power used by the RAT chipset over an SI 602. For example, the RAT chipset (and/or RAT driver) may estimate the amount of power (e.g., power estimate) used by monitoring all of the activity of the wireless communication system (e.g., transmissions, receptions, listening, and/or exiting/entering the low power state) that may occur during an SI 602. Based on the received indication of the power budget, the RAT chipset (and/or RAT driver) may determine how long the RAT chipset may be in the active state and still stay within the indicated power budget. In some cases, M2R2P may be used as a performance metric for reinforcement learning and balanced against a power estimate associated with a particular combination of TWT SP start offsets and TWT SP lengths. There may be different variations of M2R2P values that may be used as the performance metric, such as an average M2R2P value over a period of time, a peak/minimum, standard deviation, and/or other metric of the M2R2P value, M2R2P value for a certain percentile load, etc. The power estimate may be minimized by reinforcement learning.

In some cases, during the learning phase of reinforcement learning, the power saving engine may apply different TWT schedules to determine how those a TWT SP start offset and TWT SP length impacts power consumption and/or the performance metric. As an example, the power saving engine may, as a part of the learning phase of reinforcement learning, apply a first TWT schedule 610 with a TWT SP start offset of 0 ms and a TWT SP length of 4 ms. In the first TWT schedule 610, an attempt to receive the DL data 604A and send pose data 606A may occur during a first sleep cycle 620 of the first TWT schedule 610, resulting in a delay. This delayed DL data 604A and pose data 606A may result in a certain measured performance metric value to be measured for the first TWT schedule 610. For example, the XR application may measure the M2R2P average, min/max, percentile load, etc. based on the first TWT schedule 610. In some cases, a power consumption for the first TWT schedule 610 may also be measured/estimated (e.g., by the RAT). A penalty score may be determined based on the measured performance metric value (e.g., M2R2P value) and power consumption. The penalty score may then be stored, for example, in a table of penalty scores. In some cases, the measured performance metric value and/or power consumption may also (or instead) be stored. Of note, data which becomes available for transmission/reception outside of an active cycle (e.g., during a sleep cycle, like DL data 604A and pose data 606A) may be buffered for later transmission/reception, such as during a next active cycle, by, for example, an operating system/controller/processor of a wireless device.

FIG. 6B illustrates a table of penalty scores 650, in accordance with aspects of the present disclosure. As shown in FIG. 6B, penalty score 652 may be stored in the table of penalty scores 650 associated with the TWT SP start offset 654 and TWT SP length 656 used. While shown in a form of a table, it should be understood that the table of penalty scores 650 may be in any digital data format, such as a database, set of weights, tree, array, etc.

In some cases, penalty scores may be determined for a range of TWT SP start offsets and a range TWT SP lengths. In FIG. 6B, the range of TWT SP start offsets are shown on the vertical axis 660 of the table of penalty scores 650 and range TWT SP lengths shown on the horizontal axis 658 of the table of penalty scores 650. In some cases, penalty scores may be determined for each combination of values in the range of TWT SP start offsets (e.g., 0, 2, 4, . . . 12) and range of TWT SP lengths (e.g., 2, 4, . . . 12). In this example, increments of two are used for clarity, but in other cases values in the range of TWT SP start offsets and range of TWT SP lengths may be in any increments.

Returning to FIG. 6A, additional penalty scores may be determined during the learning phase of reinforcement learning. As a second example, a second TWT schedule 612 may be applied with a TWT SP start offset of 3 ms and a TWT SP length of 6 ms. Using the second TWT schedule 612, a portion of the DL data 604A may be received, while another portion of the DL data 604A may not be received during a first active cycle 614 of the second TWT schedule 612 as the first active cycle 614 ends before the DL of the DL data 604A completes. Additionally, UL of the pose data 606A may be delayed as the UL attempt of the pose data 606A may not occur during an active cycle of the second TWT schedule 612. As discussed above, a performance metric value (e.g., M2R2P value) and power consumption value may be determined based on the second TWT schedule 612 for determining a penalty score associated with the second TWT schedule 612. This penalty score may be stored in the table of penalty scores 650 of FIG. 6B.

Similarly, a third TWT schedule 616 may also be evaluated during the learning phase of reinforcement learning. The third TWT schedule 616 may have a TWT SP start offset of 8 ms and a TWT SP length of 8 ms. In this example. The DL of the DL data 604A and UL of the pose data 606A may both fit with a first active cycle 618 of the third TWT schedule 616. In some cases, a measured performance metric value for the third TWT schedule 616 may be better than those of the first TWT schedule 610 and second TWT schedule 612 as the DL/UL of the DL data 604A and pose data 606A fit within the active cycles of the third TWT schedule 616. As discussed above, a performance metric value (e.g., M2R2P value) and power consumption value may be determined based on the third TWT schedule 616 for determining a penalty score associated with the third TWT schedule 616. This penalty score may be stored in the table of penalty scores 650 of FIG. 6B. In some cases, additional penalty scores for various combination of TWT SP start offsets and TWT SP lengths may be determined, for example, to fill out (e.g., predetermine) the table of penalty scores 650 of FIG. 6B during the learning phase. In some cases, multiple tables of penalty scores 650 of FIG. 6B may be determined for different primary frequency of operations and/or different latency budgets.

In some aspects, the learning phase of reinforcement learning may be performed offline, online, or any combination thereof. In some cases, online may refer to time periods during which data for transmission (e.g., DL data 604, pose data 606, UL data 608, etc.) become available for transmission/reception by the systems and techniques described herein. In some examples, offline may refer to idle time periods or time periods during which data for transmission/reception is not being processed. Additionally, offline may be based on one or more time conditions (e.g., after a particular amount of time has expired, such as a day, a week, a month, etc.) and/or may be based on various other conditions such as network and/or server availability, etc., among various others. In some aspects, offline training of a ML model (e.g., a reinforcement learning model) can be performed by a first device (e.g., a training device) to generate a pre-trained model (e.g., with a predetermined table of penalty scores 650), and a second device can receive the trained model from the first device. In some cases, the second device (e.g., a mobile device, an XR device, a vehicle or system/component of the vehicle, or other device) can perform online (or on-device) training of the pre-trained model to further adapt or tune the parameters of the model.

In some cases, during operations, the primary frequency of operations, latency budget, and indicated power budget may be provided to the power saving engine (e.g., reinforcement learning ML model of the power saving engine) and a TWT SP start offset and a TWT SP length returned by the power saving engine for the RAT chipset of the communications engine. The RAT chipset may then implement the returned TWT SP start offset and TWT SP length in manner similar to other TWT schedules. In some cases, the TWT SP start offset and TWT SP length may be refined during operations, for example, to take into account shifts in when certain UL/DL messages are transmitted/received, changing wireless medium conditions, changes in activities by the applications executing on the wireless device, etc.

Figure 7:
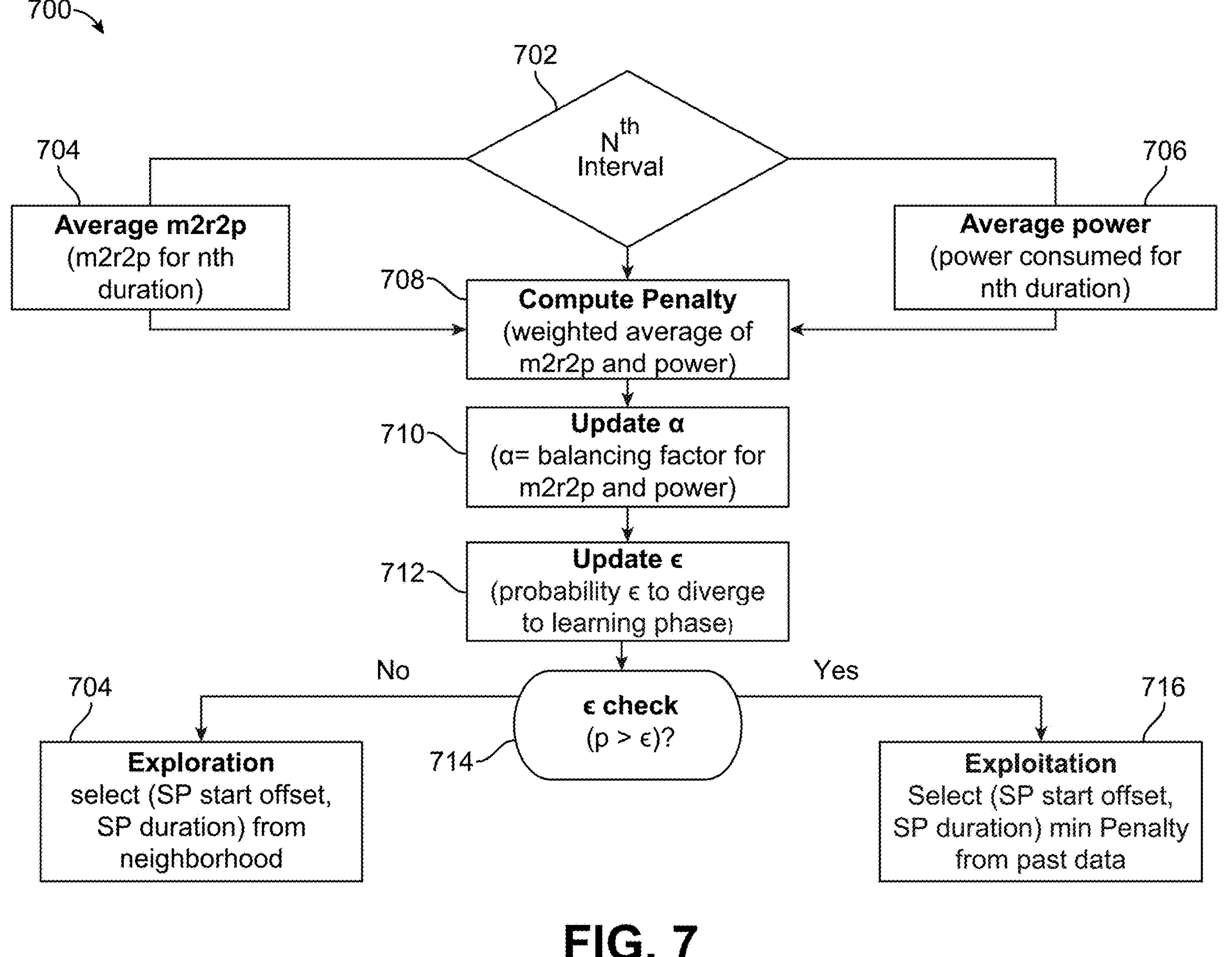
FIG. 7 is a flow diagram illustrating a technique for updating a TWT schedule of a wireless device, in accordance with aspects of the present disclosure.

FIG. 7 is a flow diagram illustrating a technique 700 for updating a TWT schedule of a wireless device, in accordance with aspects of the present disclosure. In some cases, the technique may be performed by a power savings engine (e.g., power savings engine 530 of FIG. 5) or other component of the RAT. As indicated above, a RAT chipset may request an initial TWT SP start offset and TWT SP length obtained, for example, from a power saving engine. At step 702, after N intervals (e.g., N SIs, such as SI 602 of FIG. 6A), an average of the performance metric (e.g., M2R2P) may be determined over the N intervals at step 704. An average power consumption may also be determined over the N intervals at step 706. Based on the average of the performance metric and average power consumption, a penalty value may be determined at step 708. At step 710, a balancing factor $\alpha$ may be updated based on the performance metric and the power consumption. In some cases, the balancing factor $\alpha$ may be similar to the penalty. In some cases, for the balancing factor $\alpha$, rather than using a fixed weight for performance and/or power, adjustable weights may be used, allowing the balancing factor $\alpha$ to take into account different scenarios. For example, where one criterion (e.g., performance) is met the balancing factor $\alpha$ may be used to optimize for power. In some cases, the balancing factor $\alpha$ may be applied such that the penalty=$\alpha$*performance metric+(1−$\alpha$)*average power consumption. In some cases, $\alpha$ tends to 0 when the performance metric is met and the power consumption may be minimized.

At step 712, a probability $\varepsilon$ indicating whether the computed penalty diverges from a penalty in a penalty value (e.g., expected penalty) in a table of penalty scores (e.g., table of penalty scores 650 of FIG. 6B) for a current TWT SP start offset value and TWT SP length value. At step 714, if the probability $\varepsilon$ is below a threshold probability score p (e.g., lower probability that the computed penalty diverges from the penalty value in the penalty values table), then the RAT chipset may continue to use the current TWT SP start offset value and TWT SP length value (e.g., from the penalty values table) at step 716. At step 714, if the probability $\varepsilon$ is above the threshold probability score p, then the RAT chipset may explore other TWT SP start offset value and TWT SP length value at step 718. In some cases, a new TWT SP start offset value and TWT SP length value may be selected from around the current TWT SP start offset and TWT SP length values. For example, a new TWT SP start offset value and TWT SP length value from within a certain number (e.g., range) of cells around the current TWT SP start offset value and TWT SP length value. As a more specific example with reference to FIG. 6B, if the current TWT SP start offset value is 0 and TWT SP length value is 4 (e.g., corresponding to penalty score 652), a new TWT SP start offset value may be selected from either 2 or 4 and TWT SP length value may be selected from either 6 or 8. In some cases, the TWT SP start offset value and the TWT SP length value corresponding to a lowest penalty score from the number of cells around the current TWT SP start offset value and TWT SP length value may be selected (assuming a compatible power budget). The selected TWT SP start offset value and TWT SP length value may be applied for N intervals and evaluated based on technique 700.

In some cases, while a particular TWT schedule may include active cycles and sleep cycles, an application, such as an XR application, may request transmission of data while the RAT chipset is in the sleep cycle. In some cases, rather than waking up RAT chipset to perform the transmission, out of turn data (e.g., received during a sleep cycle) may be blocked until a next active cycle.

Figure 8A:
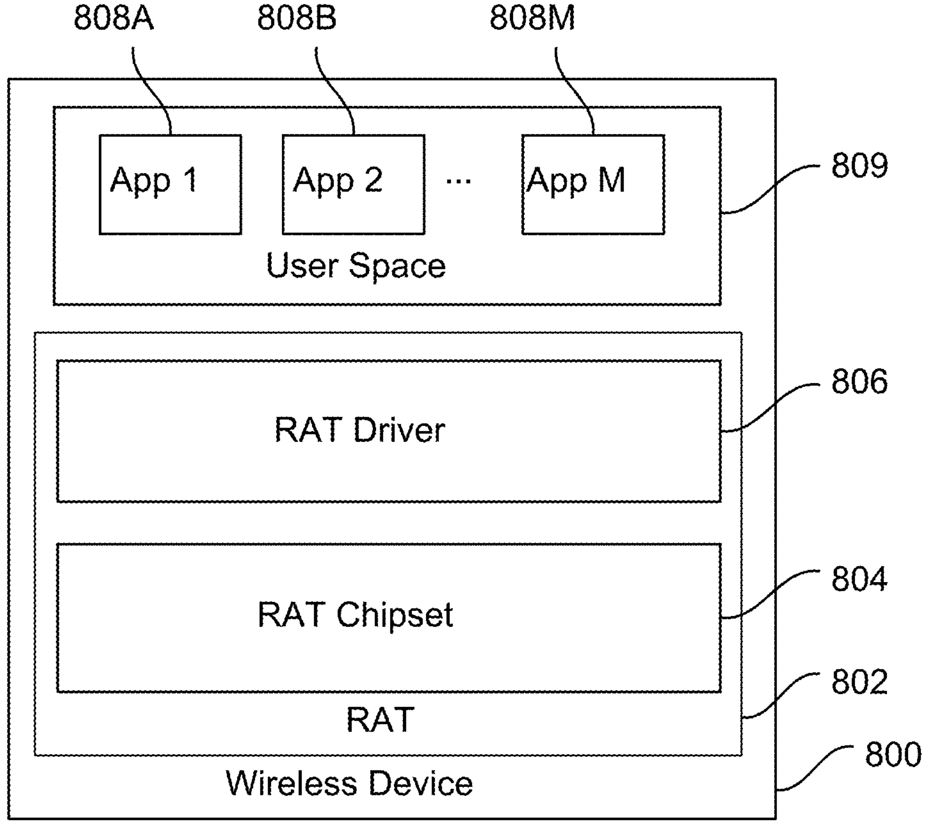
FIG. 8A is a block diagram illustrating a RAT of a wireless device configured to use a dynamic pattern for active-inactive states for wireless communications, in accordance with aspects of the present disclosure.

FIG. 8A is a block diagram illustrating a RAT of a wireless device 800 configured to use a dynamic pattern for active-inactive states for wireless communications, in accordance with aspects of the present disclosure. In some cases, a RAT 802 may include components for implementing a certain wireless networking protocol. As shown in FIG. 8A, the RAT 802 of the wireless device 800 may include RAT chipset 804 which may communicate with a RAT driver 806. In some cases, the RAT driver 806 may be software which can allow access to operations that may be performed by the RAT chipset 804 one or more applications (e.g., App 1 808A, App 2 808B, . . . App M 808M). For example, App 1 808A may transmit data via the RAT 802 by calling a command exposed by the RAT driver 806. The RAT driver 806 may then access the RAT chipset 804 to perform the transmission.

Figure 8B:
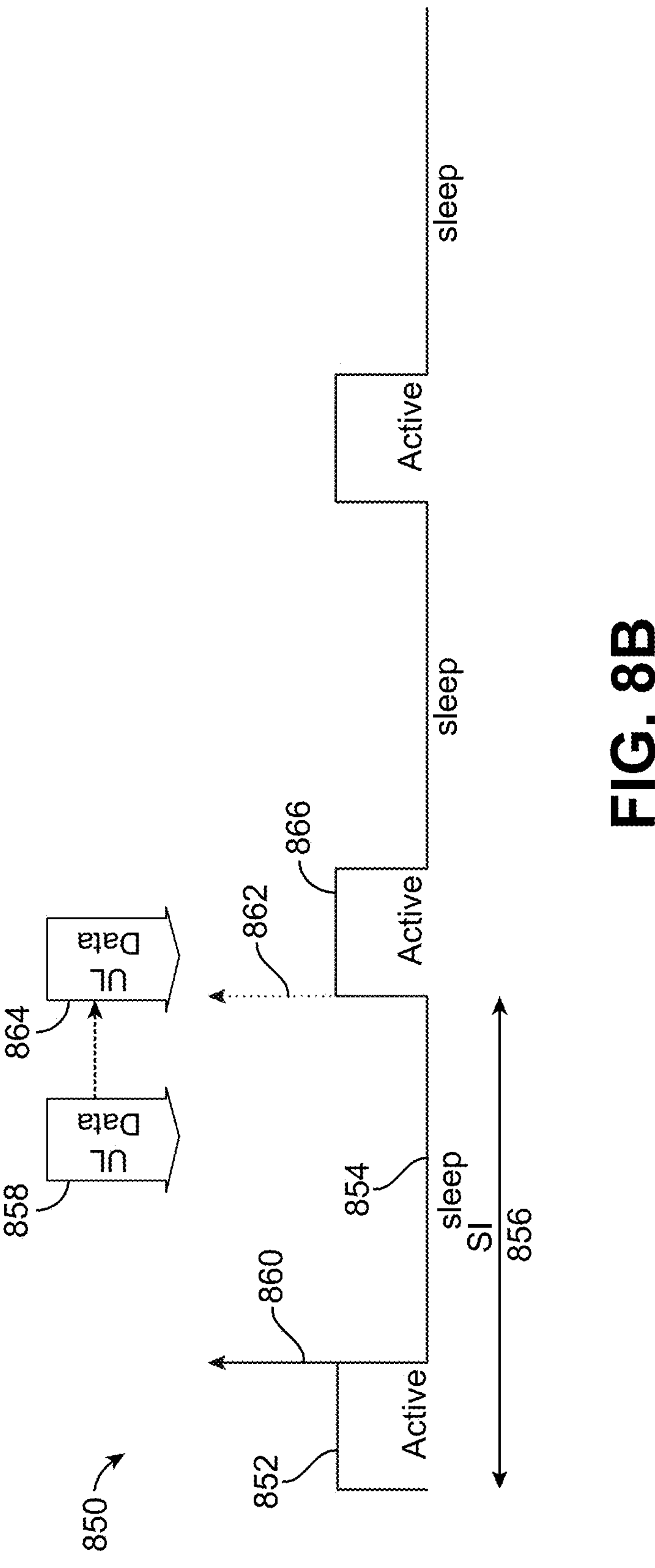
FIG. 8B is a timeline illustrating blocking of out of turn data, in accordance with aspects of the present disclosure.

FIG. 8B is a timeline illustrating blocking of out of turn data 850, in accordance with aspects of the present disclosure. As shown in FIG. 8B, the RAT chipset (e.g., RAT chipset 804 of FIG. 8A) may have an active state 852 (e.g., active cycle) and a sleep state 854 (e.g., sleep cycle) in an SI 856. The lengths of the active state 852 and the sleep state 854 may be based on a TWT pattern that may be determined in accordance with techniques discussed above with respect to FIGS. 6A-7. In some cases, to block out of turn data, such as UL data 858, that may be received while the RAT chipset is in the sleep state 854, the RAT chipset 804 may transmit a blocking indication 860 to the RAT driver (e.g., RAT driver 806 of FIG. 8A) at an end of the active state 852. In some cases, the blocking indication 860 may indicate to the RAT driver that the active state 852 has ended. After the blocking indication 860 has been received, and before an unblocking indication 862 has been received, if the RAT driver receives a request to transmit data, such as UL data 858, the RAT driver may buffer the request and not pass the request on to the RAT chipset while the RAT chipset is in the sleep state 854. In some cases, buffering the request to the RAT chipset may avoid causing the RAT chipset to exit the sleep state 854 to handle the request.

When the RAT chipset exits the sleep state 854, the RAT chipset may transmit the unblocking indication 862 to the RAT driver, indicating to the RAT driver that the RAT chipset has exited the sleep state 854. The RAT driver may then process the buffered requests during a next active state 866. For example, the RAT driver may, after receiving the unblocking indication 862, pass the buffered UL data 858 as UL data 864 to the RAT chipset for transmission during the next active state 866. In some cases, the RAT driver may transmit an indication of the block indication 860 and/or the unblocking indication 862 to one or more applications and/or operating system of the wireless device. In such cases, the one or more applications and/or operating system may delay (e.g., delay generating, buffering, avoid generating, etc.) sending out of turn requests to the RAT driver.

In some cases, rather than transmitting the blocking indication 860 and/or unblocking indication 862, the RAT driver may synchronize the wireless local area network (WLAN) timing synchronization function (TSF) from a processor to send at periodic intervals aligned with the TWT schedule. In some cases, the RAT driver may synchronize the WLAN TSF via timestamped messages, via dedicated signaling, etc.

FIG. 9 is a flow diagram illustrating an example of a process 900 for wireless communications, in accordance with aspects of the present disclosure. The process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be or may include UE device, such as the UE 104 or UE 190 of FIG. 1A, UE 147 of FIG. 1B, device 115 of FIG. 1C, etc. The operations of the process 900 may be implemented as software components that are executed and run on one or more processors.

At block 902, the computing device (or component thereof) may receive an indication of one or more parameters for input to a reinforcement learning machine learning (ML) model (e.g., of a power saving engine such as power saving engine 530 of FIG. 5). In some cases, the reinforcement learning ML model includes a set of predetermined penalty scores (e.g., a pretrained ML model including a table of penalty scores 650 of FIG. 6B). In some examples, the set of predetermined penalty scores are determined based on a training process. In some cases, the power schedule comprises a target wake time (TWT), and wherein the set of predetermined penalty scores are predetermined for a range of TWT SP start offsets and a range of lengths of time for the higher power state, and wherein the training process determines penalty scores across the range of TWT SP start offsets and range of lengths of time.

At block 904, the computing device (or component thereof) may determine a power schedule (e.g., first TWT schedule 610, second TWT schedule 612, third TWT schedule 616 of FIG. 6A, etc.) for the wireless communications chipset (e.g., RAT chipset) based on the one or more parameters using the reinforcement learning ML model. In some cases, the one or more parameters include at least one of a primary frequency of operations, a latency budget, or a power budget. In some examples, the one or more parameters may include other parameters for determining the power schedule, such as a minimum TWT SP, a maximum TWT SP, etc. In some cases, the indication of the primary frequency of operations is based on a rate at which images are received for display. The latency budget may be a maximum amount of time it takes for the motion to get reflected on the display (Max M2R2P). In some examples, the latency budget is based on a maximum allowed time for motion to be displayed. In some cases, the computing device (or component thereof) may receive a performance metric based on the power schedule and update the power schedule based on the performance metric. In some examples, the performance metric is based on an amount of time used by the device to receive an input and output an image for display (e.g., a display of the device or coupled to the device) based on the received input. In some cases, the computing device (or component thereof) may update the power schedule by: determining an amount of power (e.g., at step 706 of FIG. 7) used based on the power schedule; determining a penalty value (e.g., at step 708 of FIG. 7) based on the amount of power used and performance metric;

and comparing the determined penalty value to a stored penalty value (e.g., at step 712 of FIG. 7) associated with the power schedule.

At block 906, the computing device (or component thereof) may determine to switch the wireless communications chipset into a low power state (e.g., first sleep cycle 620 of FIG. 6A, etc.) or a higher power state (e.g., first active cycle 614 of FIG. 6A, first active cycle 618 of FIG. 6A, etc.) based on the determined power schedule. In some cases, the computing device (or component thereof) may transmit an indication to block requests for the wireless communications chipset while the wireless communications chipset is in the low power state; and transmit an indication to unblock requests for the wireless communications chipset while the wireless communications chipset is in the higher power state. In some cases, the indication to block requests and the indication to unblock requests are transmitted to a driver for the wireless communications chipset. In some examples, a driver for the wireless communications chipset is configured to block requests for the wireless communications chipset and unblock requests for the wireless communications chipset based on the power schedule. For example, the wireless communications chipset may send the determined power schedule to the driver and the driver may block requests based on sent determined power schedule.

In some examples, the techniques or processes described herein may be performed by a computing device, an apparatus, and/or any other computing device. For example, the techniques or processes discussed may be applied to an HMD device, companion device, or other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 900, and/or other processes described herein may include a processor, microprocessor, micro-computer, or other component of a device that is configured to carry out the steps of the process 900, and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 900, and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900, is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 900) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
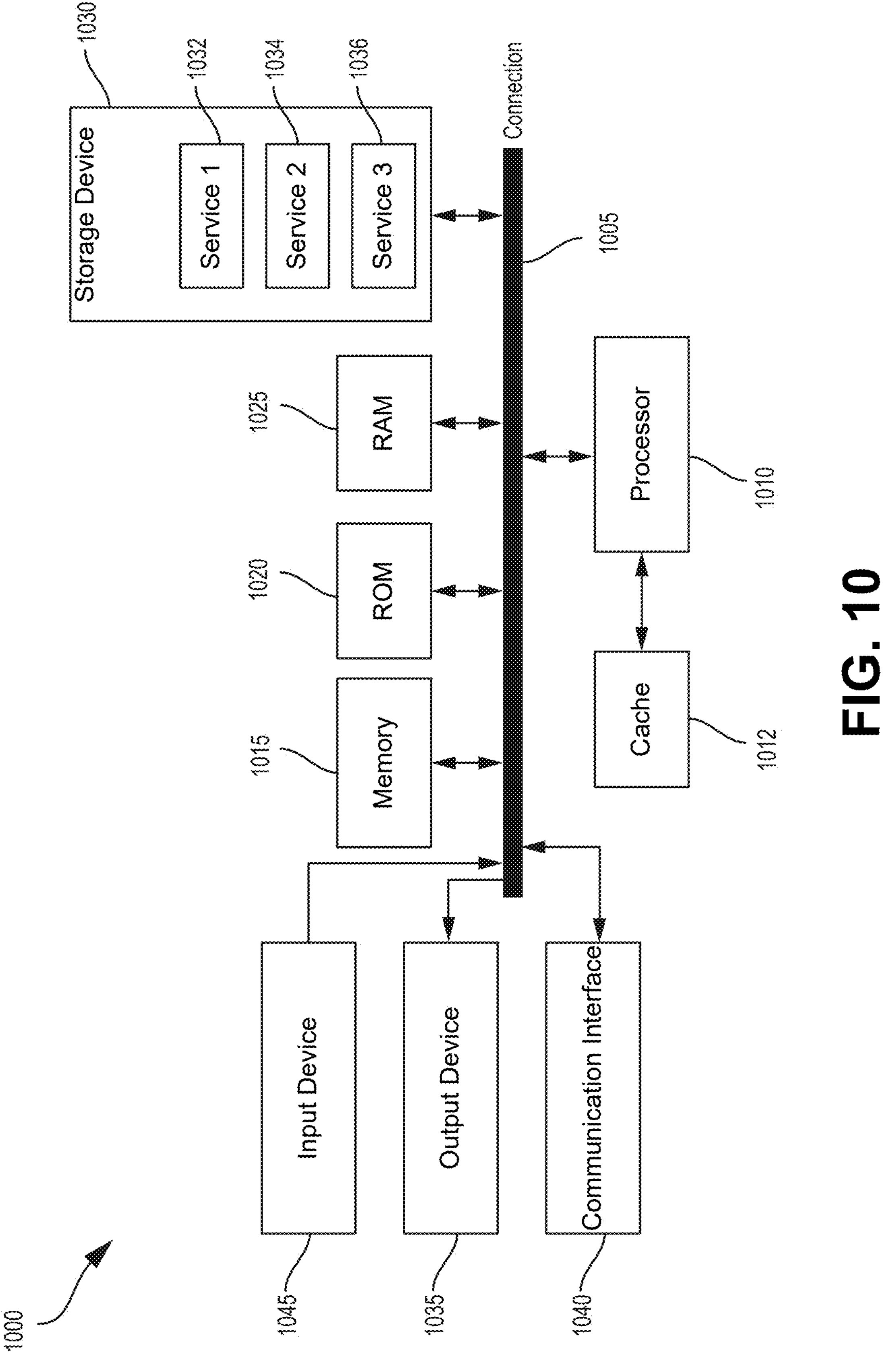
FIG. 10 is a diagram illustrating an example of a computing system, according to aspects of the present disclosure.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some aspects, computing system 1000 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 may include a cache 1012 of high-speed memory connected directly with, in close proximity to, or integrated as part of processor 1010.

Processor 1010 may include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some aspects, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative Aspects of the Disclosure Include:

Aspect 1. A device for wireless communications, comprising: at least one memory comprising instructions; a wireless communications chipset; and at least one processor coupled to wireless communications chipset and the at least one memory and configured to: receive an indication of one or more parameters for input to a reinforcement learning machine learning (ML) model; determine a power schedule for the wireless communications chipset based on the one or more parameters using the reinforcement learning ML model; and determine to switch the wireless communications chipset into a low power state or a higher power state based on the determined power schedule.

Aspect 2. The device of Aspect 1, wherein the one or more parameters include at least one of a primary frequency of operations, a latency budget, or a power budget.

Aspect 3. The device of Aspect 2, wherein the indication of the primary frequency of operations is based on a rate at which images are received for display.

Aspect 4. The device of any of Aspects 2-3, wherein the latency budget is based on a maximum allowed time for motion to be displayed.

Aspect 5. The device of any of Aspects 2-3, wherein the at least one processor is further configured to: receive a performance metric based on the power schedule; and update the power schedule based on the performance metric.

Aspect 6. The device of Aspect 5, wherein the performance metric is based on an amount of time used by the device to receive an input and output an image for display based on the received input.

Aspect 7. The device of any of Aspects 5-6, wherein, to update the power schedule, the at least one processor is configured to: determine an amount of power used based on the power schedule; determine a penalty value based on the amount of power used and performance metric; and compare the determined penalty value to a stored penalty value associated with the power schedule.

Aspect 8. The device of any of Aspects 1-7, wherein the reinforcement learning ML model includes a set of predetermined penalty scores.

Aspect 9. The device of Aspect 8, wherein the set of predetermined penalty scores are determined based on a training process.

Aspect 10. The device of Aspect 9, wherein the power schedule comprises a target wake time (TWT), and wherein the set of predetermined penalty scores are predetermined for a range of TWT service period start offsets and a range of lengths of time for the higher power state, and wherein the training process determines penalty scores across the range of TWT service period start offsets and range of lengths of time.

Aspect 11. The device of any of Aspects 1-10, wherein the at least one processor is further configured to: transmit an indication to block requests for the wireless communications chipset while the wireless communications chipset is in the low power state; and transmit an indication to unblock requests for the wireless communications chipset while the wireless communications chipset is in the higher power state.

Aspect 12. The device of Aspect 11, wherein the indication to block requests and the indication to unblock requests are transmitted to a driver for the wireless communications chipset.

Aspect 13. The device of any of Aspects 1-12, wherein a driver for the wireless communications chipset is configured to block requests for the wireless communications chipset and unblock requests for the wireless communications chipset based on the power schedule.

Aspect 14. A method for wireless communications, comprising: receiving an indication of one or more parameters for input to a reinforcement learning machine learning (ML) model; determining a power schedule for a wireless communications chipset based on the one or more parameters using the reinforcement learning ML model; and determining to switch the wireless communications chipset into a low power state or a higher power state based on the determined power schedule.

Aspect 15. The method of Aspect 14, wherein the one or more parameters include at least one of a primary frequency of operations, a latency budget, or a power budget.

Aspect 16. The method of Aspect 15, wherein the indication of the primary frequency of operations is based on a rate at which images are received for display.

Aspect 17. The method of any of Aspects 15-16, wherein the latency budget is based on a maximum allowed time for motion to be displayed.

Aspect 18. The method of any of Aspects 15-17, further comprising: receiving a performance metric based on the power schedule; and updating the power schedule based on the performance metric.

Aspect 19. The method of Aspect 18, wherein the performance metric is based on an amount of time used by a device to receive an input and output an image for display based on the received input.

Aspect 20. The method of any of Aspects 18-19, wherein updating the power schedule comprises: determining an amount of power used based on the power schedule; determining a penalty value based on the amount of power used and performance metric; and comparing the determined penalty value to a stored penalty value associated with the power schedule.

Aspect 21. The method of any of Aspects 14-20, wherein the reinforcement learning ML model includes a set of predetermined penalty scores.

Aspect 22. The method of Aspect 21, wherein the set of predetermined penalty scores are determined based on a training process.

Aspect 23. The method of Aspect 22, wherein the power schedule comprises a target wake time (TWT), and wherein the set of predetermined penalty scores are predetermined for a range of TWT service period start offsets and a range of lengths of time for the higher power state, and wherein the training process determines penalty scores across the range of TWT service period start offsets and range of lengths of time.

Aspect 24. The method of any of Aspects 14-23, further comprising: transmitting an indication to block requests for the wireless communications chipset while the wireless communications chipset is in the low power state; and transmitting an indication to unblock requests for the wireless communications chipset while the wireless communications chipset is in the higher power state.

Aspect 25. The method of Aspect 24, wherein the indication to block requests and the indication to unblock requests are transmitted to a driver for the wireless communications chipset.

Aspect 26. The method of any of Aspects 14-25, wherein a driver for the wireless communications chipset is configured to block requests for the wireless communications chipset and unblock requests for the wireless communications chipset based on the power schedule.

Aspect 27. A non-transitory computer-readable medium having stored thereon instructions that, when executed by at least one processor, cause the at least one processor to perform operations according to any of Aspects 14-26.

Aspect 28. An apparatus comprising means for performing a method according to any of Aspects 14 to 26.

What is claimed is:

1. A device for wireless communications, comprising:

at least one memory comprising instructions;

a wireless communications chipset; and at least one processor coupled to wireless communications chipset and the at least one memory and configured to:

receive an indication of one or more parameters for input to a reinforcement learning machine learning (ML) model;

determine a power schedule for the wireless communications chipset based on the one or more parameters using the reinforcement learning ML model;

measure a value for a performance metric based on a human perceptible delay or human perceptible performance change resulting in image quality degradation;

update the power schedule based on the value, wherein, to update the power schedule, the at least one processor is configured to:

determine an amount of power used based on the power schedule;

determine a penalty value based on the amount of power used and the performance metric; and compare the determined penalty value to a stored penalty value associated with the power schedule to determine whether the determined penalty value diverges from the stored penalty value; and determine to switch the wireless communications chipset into a low power state or a higher power state based on the updated power schedule.

2. The device of claim 1, wherein the one or more parameters include at least one of a primary frequency of operations, a latency budget, or a power budget.

3. The device of claim 2, wherein the indication of the primary frequency of operations is based on a rate at which images are received for display.

4. The device of claim 2, wherein the latency budget is based on a maximum allowed time for motion to be displayed.

5. The device of claim 1, wherein the performance metric is based on an amount of time used by the device to receive an input and output an image for display based on the received input.

6. The device of claim 1, wherein the reinforcement learning ML model includes a set of predetermined penalty scores.

7. The device of claim 6, wherein the set of predetermined penalty scores are determined based on a training process.

8. The device of claim 7, wherein the power schedule comprises a target wake time (TWT), and wherein the set of predetermined penalty scores are predetermined for a range of TWT service period start offsets and a range of lengths of time for the higher power state, and wherein the training process determines penalty scores across the range of TWT service period start offsets and range of lengths of time.

9. The device of claim 1, wherein the at least one processor is further configured to:

transmit an indication to block requests for the wireless communications chipset while the wireless communications chipset is in the low power state; and transmit an indication to unblock requests for the wireless communications chipset while the wireless communications chipset is in the higher power state.

10. The device of claim 9, wherein the indication to block requests and the indication to unblock requests are transmitted to a driver for the wireless communications chipset.

11. The device of claim 1, wherein a driver for the wireless communications chipset is configured to block requests for the wireless communications chipset and unblock requests for the wireless communications chipset based on the power schedule.

12. The device of claim 1, wherein the at least one processor is further configured to apply an adjustable balancing factor to the performance metric.

13. A method for wireless communications, comprising:

receiving an indication of one or more parameters for input to a reinforcement learning machine learning (ML) model;

determining a power schedule for a wireless communications chipset of a device based on the one or more parameters using the reinforcement learning ML model;

measuring, by the device, a value for a performance metric based on a human perceptible delay or human perceptible performance change resulting in image quality degradation;

updating the power schedule based on the value, wherein updating the power schedule comprises:

determining an amount of power used based on the power schedule;

determining a penalty value based on the amount of power used and the performance metric; and comparing the determined penalty value to a stored penalty value associated with the power schedule to determine whether the determined penalty value diverges from the stored penalty value; and determining to switch the wireless communications chipset into a low power state or a higher power state based on the updated power schedule.

14. The method of claim 13, wherein the one or more parameters include at least one of a primary frequency of operations, a latency budget, or a power budget.

15. The method of claim 14, wherein the indication of the primary frequency of operations is based on a rate at which images are received for display.

16. The method of claim 14, wherein the latency budget is based on a maximum allowed time for motion to be displayed.

17. The method of claim 13, wherein the performance metric is based on an amount of time used by a device to receive an input and output an image for display based on the received input.

18. The method of claim 13, wherein the reinforcement learning ML model includes a set of predetermined penalty scores.

19. The method of claim 13, further comprising:

transmitting an indication to block requests for the wireless communications chipset while the wireless communications chipset is in the low power state; and transmitting an indication to unblock requests for the wireless communications chipset while the wireless communications chipset is in the higher power state.

* * * * *